United States Patent
Yu et al.

(10) Patent No.: US 9,419,765 B2
(45) Date of Patent: Aug. 16, 2016

(54) METHOD AND APPARATUS FOR TRANSMITTING AND RECEIVING CHANNEL STATE INFORMATION

(71) Applicant: Samsung Electronics Co., Ltd., Gyeonggi-do (KR)

(72) Inventors: Hyoungyoul Yu, Seoul (KR); Younsun Kim, Gyeonggi-do (KR); Hyojin Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 14/307,381

(22) Filed: Jun. 17, 2014

(65) Prior Publication Data

US 2014/0369279 A1 Dec. 18, 2014

(30) Foreign Application Priority Data

| Jun. 17, 2013 | (KR) | 10-2013-0069245 |
| Jun. 19, 2013 | (KR) | 10-2013-0070643 |
| Jun. 25, 2013 | (KR) | 10-2013-0073369 |
| Aug. 7, 2013 | (KR) | 10-2013-0093861 |

(51) Int. Cl.
| H04W 4/00 | (2009.01) |
| H04L 5/00 | (2006.01) |
| H04B 7/04 | (2006.01) |
| H04B 7/06 | (2006.01) |
| H04B 7/10 | (2006.01) |

(52) U.S. Cl.
CPC ............ *H04L 5/0053* (2013.01); *H04B 7/0478* (2013.01); *H04B 7/0469* (2013.01); *H04B 7/0486* (2013.01); *H04B 7/063* (2013.01); *H04B 7/065* (2013.01); *H04B 7/0639* (2013.01); *H04B 7/10* (2013.01)

(58) Field of Classification Search
CPC ........ H04L 5/0053; H04B 7/10; H04B 7/063; H04B 7/065; H04B 7/0469; H04B 7/0478; H04B 7/0486; H04B 7/0639
See application file for complete search history.

(56) References Cited

U.S. PATENT DOCUMENTS

| 8,897,272 B2 | 11/2014 | Zhang et al. | |
| 9,042,321 B2* | 5/2015 | Ko | H04B 7/063 370/329 |
| 9,300,375 B2* | 3/2016 | Ko | H04B 7/0417 |

(Continued)

FOREIGN PATENT DOCUMENTS

| EP | 2536083 A1 | 12/2012 |
| EP | 2568622 A1 | 3/2013 |

OTHER PUBLICATIONS

International Search Report dated Oct. 8, 2014 in connection with International Application No. PCT/KR2014/005319 3 pages.

*Primary Examiner* — Kevin Mew

(57) ABSTRACT

A communication method of a user equipment in a mobile communication system. The method includes receiving a control signal from a base station, the control signal comprising at least one of: a first information element or a second information element; determining, if a field of the first information element is set to a predetermined value and a channel state information (CSI) reporting mode determined based on the second information element is a redetermined mode, a codebook based on the CSI reporting mode; generating a CSI based on the determined codebook, the CSI comprising at least one of a rank indicator (RI), a first precoding matrix indicator (PMI), or a second PMI; and reporting the generated CSI to the base station.

20 Claims, 10 Drawing Sheets

(56) References Cited

U.S. PATENT DOCUMENTS

| | | | |
|---|---|---|---|
| 2012/0076023 A1* | 3/2012 | Ko | H04B 7/063 370/252 |
| 2012/0076024 A1* | 3/2012 | Ko | H04L 1/0026 370/252 |
| 2012/0127948 A1* | 5/2012 | Chung | H04L 5/0053 370/329 |
| 2012/0140649 A1* | 6/2012 | Choudhury | H04W 24/10 370/252 |
| 2012/0207240 A1* | 8/2012 | Chen | H04B 7/0417 375/285 |
| 2012/0218948 A1* | 8/2012 | Onggosanusi | H04L 1/0031 370/329 |
| 2012/0320783 A1* | 12/2012 | Wu | H04B 7/0689 370/252 |
| 2013/0044624 A1* | 2/2013 | Su | H04L 1/0026 370/252 |
| 2013/0058295 A1* | 3/2013 | Ko | H04B 7/063 370/329 |
| 2013/0094464 A1* | 4/2013 | Li | H04B 7/066 370/329 |
| 2013/0100911 A1* | 4/2013 | Lv | H04L 1/0026 370/329 |
| 2013/0121318 A1 | 5/2013 | Zhang et al. | |
| 2013/0136203 A1 | 5/2013 | Chen et al. | |
| 2013/0142125 A1 | 6/2013 | Shimezawa et al. | |
| 2013/0163687 A1 | 6/2013 | Jing et al. | |
| 2013/0194943 A1* | 8/2013 | Davydov | H04W 72/085 370/252 |
| 2013/0208604 A1* | 8/2013 | Lee | H04L 25/0226 370/252 |
| 2013/0301448 A1* | 11/2013 | Sayana | H04W 24/10 370/252 |
| 2014/0133445 A1* | 5/2014 | Zhu | H04B 7/024 370/329 |
| 2014/0169300 A1* | 6/2014 | Kim | H04L 5/0057 370/329 |
| 2014/0328422 A1* | 11/2014 | Chen | H04B 7/0417 375/267 |
| 2015/0162966 A1* | 6/2015 | Kim | H04B 17/00 370/252 |

* cited by examiner

METHOD AND APPARATUS FOR TRANSMITTING AND RECEIVING CHANNEL STATE INFORMATION

CROSS-REFERENCE TO RELATED APPLICATION(S) AND CLAIM OF PRIORITY

The present application is related to and claims priority under 35 U.S.C. §119 to an application filed in the Korean Intellectual Property Office on Jun. 17, 2013 and assigned Application No. 10-2013-0069245, to an application filed in the Korean Intellectual Property Office on Jun. 19, 2013 and assigned Application No. 10-2013-0070643, to an application filed in the Korean Intellectual Property Office on Jun. 25, 2013 and assigned Application No. 10-2013-0073369, and to an application filed in the Korean Intellectual Property Office on Aug. 7, 2013 and assigned Application No. 10-2013-0093861, the contents of which are incorporated herein by reference.

TECHNICAL FIELD

The present disclosure relates to a method and apparatus for transmitting and receiving Channel State Information (CSI).

BACKGROUND

The mobile communication system has evolved into a high-speed, high-quality wireless packet data communication system to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support the high-speed, high-quality wireless packet data communication services. Particularly, LTE is a communication standard developed to support high speed packet data transmission and to maximize the throughput of the radio communication system with various radio access technologies. LTE-A is the evolved version of LTE to improve the data transmission capability.

Typically, LTE base stations and terminals are based on 3GPP Release 8 or 9, while LTE-A base stations and terminals are based on 3GPP Release 10. The 3GPP standard organization is preparing for the next release for more improved performance beyond LTE-A.

The existing $3^{rd}$ and $4^{th}$ generation wireless packet data communication systems (such as HSDPA, HSUPA, HRPD, and LTE/LTE-A) adopt Adaptive Modulation and Coding (AMC) and Channel-Sensitive Scheduling techniques to improve the transmission efficiency. AMC allows the transmitter to adjust the data amount to be transmitted according to the channel condition. That is, the transmitter is capable of decreasing the data transmission amount for bad channel conditions so as to fix the received signal error probability at a certain level, or increasing the data transmission amount for good channel conditions so as to transmit large amounts of information efficiently while maintaining the received signal error probability at an intended level. The channel sensitive scheduling allows the transmitter to serve the user having a good channel condition selectively among a plurality of users so as to increase the system capacity as compared to allocating a channel fixedly to serve a single user. This increase in system capacity is referred to as multi-user diversity gain. Both the AMC and channel sensitive scheduling are the method of adopting the best modulation and coding scheme at the most efficient time based on the partial channel state information feedback from the receiver.

A User Equipment (UE) is capable of performing the channel state information feedback to an evolved Node B (eNE) in one of a periodic CSI report mode or aperiodic CSI report mode. In the periodic CSI, the UE reports the channel state information periodically. The channel state information may include at least one of Rank Indication (RI), Precoding Matrix Index (PMI), and Channel Quality Indicator (CQI). In the aperiodic CSI report, the UE reports the channel state information in response to the request from the eNB.

In case of using AMC along with Multiple Input Multiple Output (MIMO) transmission scheme, it may be necessary to take a number of spatial layers and ranks for transmitting signals into consideration. In this case, the transmitter determines the optimal data rate in consideration of the number of layers for use in MIMO transmission as well as coding rate and modulation scheme.

FIG. 1 is a graph illustrating time-frequency resources in a LTE/LTE-A system.

As shown in FIG. 1, the radio resource for transmission from the evolved Node B (eNB) to a User Equipment (UE) is divided into Resource Blocks (RBs) in the frequency domain and subframes in the time domain. In the LTE/LTE-A system, an RB consists of 12 consecutive carriers and has a bandwidth of 180 kHz in general. A subframe consists of 14 OFDM symbols and spans 1 msec. The LTE/LTE-A system allocates resources for scheduling in units of subframes in the time domain and in units of RBs in the frequency domain.

FIG. 2 is a time-frequency grid illustrating a single resource block of a downlink subframe as a smallest scheduling unit in the LTE/LTE-A system.

The radio resource depicted in FIG. 2 is of one subframe in the time domain and one RB in the frequency domain. The radio resource consists of 12 subcarriers in the frequency domain and 14 OFDM symbols in the time domain, i.e., 168 unique frequency-time positions. In LTE/LTE-A, each frequency-time position is referred to as Resource Element (RE). One subframe consists of two slots, and each slot consists of 7 OFDM symbols.

The radio resource structured as shown in FIG. 2 can be configured to transmit different types of signals as follows:
  CRS (Cell-specific Reference Signal): A reference signal broadcast within a cell at every subframe for use, at all the UEs within the cell, in channel estimation between the eNB and UE, monitoring radio link for validity, and fine tuning of time or frequency at baseband;
  DMRS (Demodulation Reference Signal): A reference signal transmitted to a specific UE;
  PDSCH (Physical Downlink Shared Channel): A data channel transmitted in downlink, which the eNB uses to transmit data to the UE, and mapped to REs not used for reference signal transmission in the data region of FIG. 2;
  CSI-RS (Channel Status Information Reference Signal) A reference signal transmitted to the UEs within a cell and used for channel state measurement. Multiple CSI-RSs can be transmitted within a cell;
  Other control channels (PHICH, PCFICH, PDCCH): Channels for providing control channels necessary for the UE to receive PDCCH, and transmitting ACK/NACK of HARQ operation for uplink data transmission.

In addition to the above signals, zero power CSI-RS may be configured in order for the UEs within the corresponding cells to receive the CSI-RSs transmitted by different eNBs in the LTE-A system. The zero power CSI-RS can be applied to the positions designated for CSI-RS, and the UE receives the traffic signal on the resource excluding the zero power CSI-RS positions in general. In the LTE-A system, the zero power CSI-RS is referred to as 'muting.' This is because the muting by nature is mapped to the CSI-RS positions without transmission power.

In FIG. 2, the CSI-RS can be transmitted at some of the positions marked by A, B, C, D, E, F, G, H, I, and J according to the number of number of antennas transmitting CSI-RS. Also, the zero power CSI-RS (muting) can be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, all of the specific pattern is used for CSI-RS transmission; and for eight antenna ports, two patterns are used for CSI-RS transmission. Muting is performed by pattern. That is, although the muting may be applied to plural patterns, if the muting positions mismatch CSI-RS positions, it cannot be applied to one pattern partially. However, if the CSI-RS positions match the zero power CSI-RS (muting) positions, the muting can be applied to a part of one pattern.

In the case of transmitting CSI-RS for two antenna ports, the CSI-RS is mapped to two REs contiguous in the time domain with the orthogonal codes for distinguishing between the antenna ports. In the case of transmitting CSI-RS for four antenna ports, two REs are added for another two antenna ports to transmit the CSI-RS in the same way. The CSI-RS transmission for eight antenna ports is performed in the same way.

In a cellular system, the reference signal is transmitted for downlink channel state measurement. In the case of the 3GPP LTE-A system, the UE measures the channel state based on the CSI-RS transmitted by the eNB. The channel state is measured in consideration of a few factors including downlink interference. The downlink interference includes the interference caused by the antennas of neighbor eNBs and thermal noise that are important in determining the downlink channel condition. For example, in the case that the eNB with one transmit antenna transmits the reference signal to the UE with one receive antenna, the UE determines energy per symbol (Es) that can be received in downlink and interference amount (Io) that may be received for the duration of receiving the corresponding symbol to calculate Es/Io from the received reference signal. The calculated Es/Io is reported to the eNB such that the eNB determines the downlink data rate for the UE.

In the LTE-A system, the UE feeds back the information on the downlink channel state for use in downlink scheduling of the eNB. That is, the UE measures the reference signal transmitted by the eNB in downlink and feeds back the information estimated from the reference signal to the eNB in the format defined in LTE/LTE-A standard. In LTE/LTE-A, the UE feedback information includes the following three indicators:

RI (Rank Indicator): The number of spatial layers that can be supported by the current channel experienced at the UE;

PMI (Precoding Matrix Indicator): A precoding matrix recommended by the current channel experienced at the UE;

CQI (Channel Quality Indicator): A maximum possible data rate that the UE can receive signals in the current channel state. CQI may be replaced with the SINR, maximum error correction code rate and modulation scheme, or per-frequency data efficiency that can be used in similar way to the maximum data rate.

The RI, PMI, and CQI are associated with each other in meaning. For example, the precoding matrix supported in LTE/LTE-A is configured differently per rank. Accordingly, the PMI value 'X' is interpreted differently for the cases of RI set to 1 and RI set to 2. Also, when determining CQI, the UE assumes that the PMI and RI which it has reported are applied by the eNB. That is, if the UE reports RI_X, PMI_Y, and CQI_Z, this means that the UE is capable of receiving the signal at the data rate corresponding to CQI_Z when the rank RI_X and the precoding matrix PMI_Y are applied. In this way, the UE calculates CQI with which the optimal performance is achieved in real transmission under the assumption of the transmission mode to be selected by the eNB.

SUMMARY

To address the above-discussed deficiencies, it is a primary object to provide a novel feedback method that is capable of improving 4-Tx MIMO transmission performance using a newly proposed codebook having a large number of precoders as compared to the legacy codebooks and being applicable to the periodic channel state information report in an LTE-A system.

In accordance with an aspect of the present disclosure, there is provided a communication method of a user equipment in a mobile communication system. The method includes receiving a control signal from a base station, the control signal comprising at least one of: a first information element or a second information element; determining, if a field of the first information element is set to a predetermined value and a channel state information (CSI) reporting mode determined based on the second information element is a redetermined mode, a codebook based on the CSI reporting mode; generating a CSI based on the determined codebook, the CSI comprising at least one of a rank indicator (RI), a first precoding matrix indicator (PMI), or a second PMI; and reporting the generated CSI to the base station.

In accordance with another aspect of the present disclosure, there is provided a communication method of a base station in a mobile communication system. The method includes transmitting a control signal to a user equipment, the control signal comprising at least one of: a first information element or a second information element; and receiving a report for channel state information (CSI) from the user equipment, wherein if a field of the first information element is set to a predetermined value and a CSI reporting mode determined based on the second information element is a predetermined mode, a codebook is determined based on the CSI reporting mode, wherein the report for CSI is generated based on the determined codebook, the CSI comprising at least one of a rank indicator (RI), a first precoding matrix indicator (PMI), or a second PMI.

In accordance with another aspect of the present disclosure, there is provided a communication apparatus of a user equipment. The apparatus includes a transceiver to communicate with a base station; and a controller to control: receiving a control signal from a base station, the control signal comprising at least one of: a first information element or a second information element; determining, if a field of the first information element is set to a predetermined value and a channel state information (CSI) reporting mode determined based on the second information element is a predetermined mode, a codebook based on the CSI reporting mode; generating a CSI based on the determined codebook, the CSI comprising at least one of a rank indicator (RI), a first precoding matrix indicator (PMI), or a second PMI; and reporting the generated CSI to the base station.

In accordance with another aspect of the present disclosure there is provided a communication apparatus of a base station. The apparatus includes a transceiver to communicate with a user equipment; and a controller to control transmitting a control signal to a user equipment, the control signal comprising at least one of: a first information element or a second information element; and receiving a report for channel state information (CSI) from the user equipment, wherein if a field of the first information element is set to a predetermined value and a CSI reporting mode determined based on the second information element is a predetermined mode, a codebook is determined based on the CSI reporting mode, wherein the report for CSI is generated based on the determined codebook, the CSI comprising at least one of a rank indicator (RI), a first precoding matrix indicator (PMI) or a second PMI.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
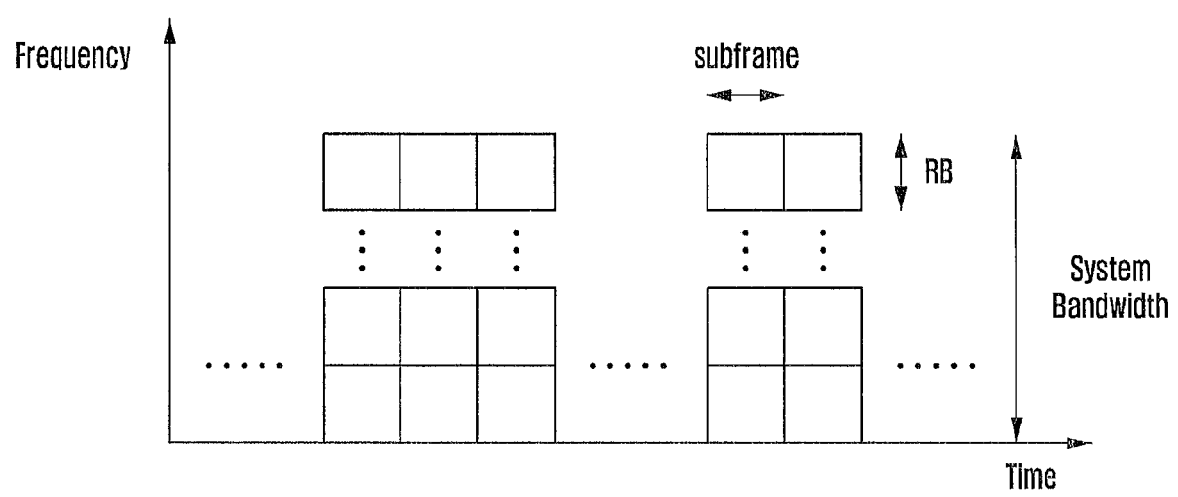
FIG. 1 is a graph illustrating time-frequency resources in LTE/LTE-A system.
Figure 2:
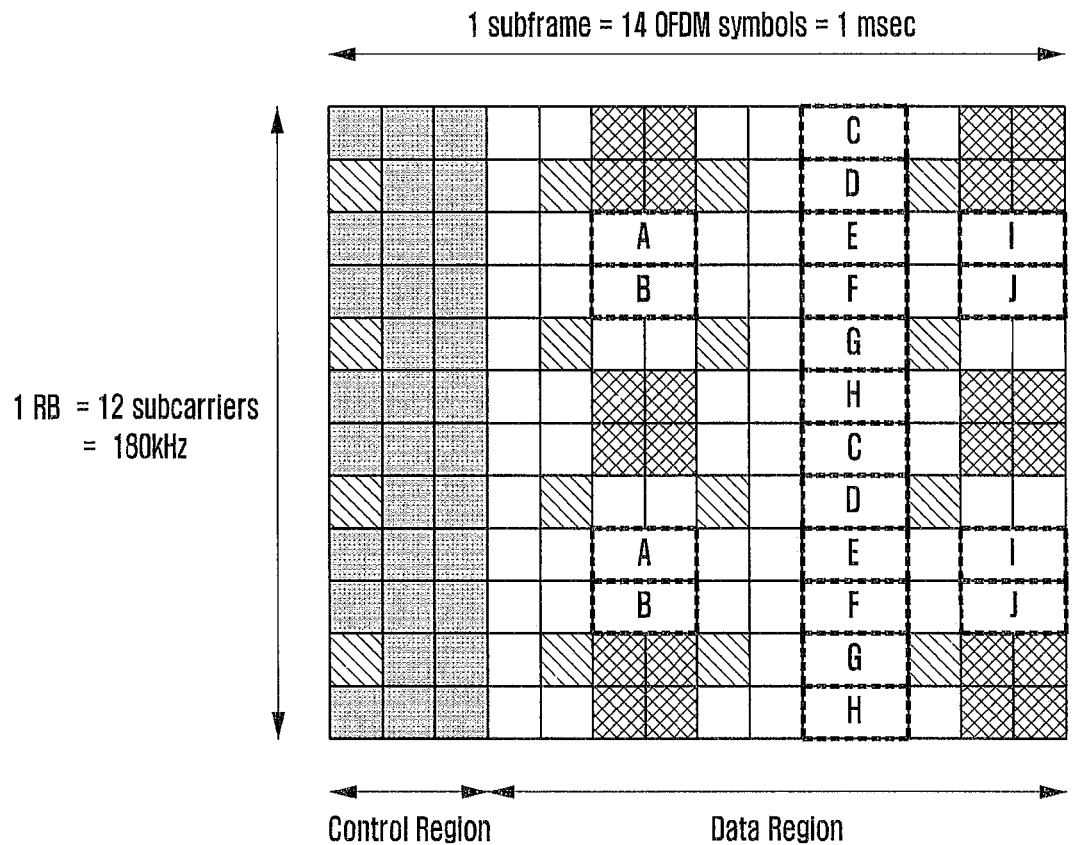
FIG. 2 is a time-frequency grid illustrating a single resource block of a downlink subframe as a smallest scheduling unit in the LTE/LTE-A system.

FIGS. 3 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Exemplary embodiments of the present disclosure are described with reference to the accompanying drawings in detail. Detailed description of well-known functions and structures incorporated herein may be omitted to avoid obscuring the subject matter of the present disclosure. Further, the following terms are defined in consideration of the functionality in the present disclosure, and may vary according to the intention of a user or an operator, usage, etc. Therefore, the definition should be made on the basis of the overall content of the present specification.

Although the description is directed to the OFDM-based radio communication system, particularly the 3GPP EUTRA, it will be understood by those skilled in the art that the present disclosure can be applied to other communication systems having a similar technical background and channel format, with a slight modification, without departing from the spirit and scope of the present disclosure.

Exemplary embodiments of the present disclosure are described hereinafter in detail with reference to the accompanying drawings.

Detailed description of well-known functions and structures incorporated herein may be omitted to avoid obscuring the subject matter of the present disclosure. This aims to omit unnecessary description so as to make the subject matter of the present disclosure clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

In MIMO transmission, precoding denotes a technique of multiplying weights reflecting the channel states between transmission and reception antennas to the respective transmission antennas to improve reception performance. A matrix made up of the weights multiplied to the respective antennas is referred to as precoding matrix, and a set of available precoding matrices is referred to as codebook.

Figure 3:
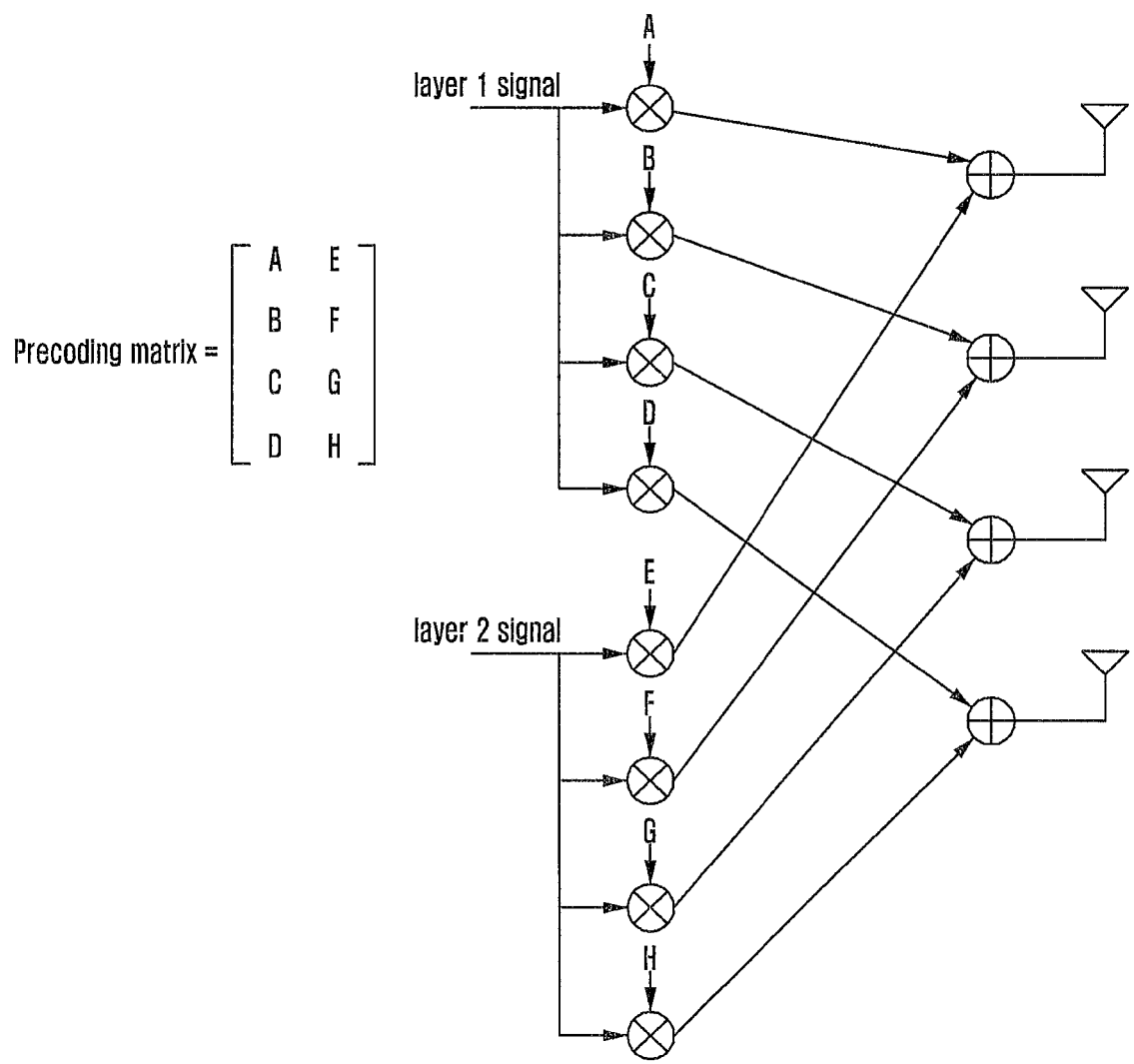
FIG. 3 is a diagram illustrating an example precoding operation at rank 2.

FIG. 3 is a diagram illustrating an example precoding operation at rank 2.

In order to check the channel state, the eNB transmits reference signals such as CSI-RS, and the UE generates downlink channel feedback information such as Rank Indicator (RI), Channel Quality Indicator (CQI), Precoding Matrix Indicator (PMI), and transmits the feedback information to the eNB. The periodic feedback of UE is performed on Physical Uplink Control Channel (PUCCH) in one of four modes as follows:

1. Mode 1-0: RI, wideband CQI (wCQI)
2. Mode 1-1: RI, wCQI, wideband PMI (wPMI)
   2-1. 8 CSI-RS antenna ports are configured
   2-1-1. submode 1: jointly encoded RI and first PMI
   2-1-2. submode 2: wCQI, first PMI, second PMI
3. mode 2-0: RI, wCQI, subband CQI (sCQI)
4. mode 2-1: RI, wCQI, wPMI, sCQI, sPMI The feedback timings of the individual feedback informations are determined based on $N_{pd}$, $N_{OFFSET,CQI}$, $M_{RI}$, and $N_{OFFSET,RI}$ transmitted through higher layer signaling. In the feedback mode 1-0, the transmission interval of wCQI is $N_{pd}$, which is determined based on the subframe offset value of $N_{OFFSET,CQI}$. Also, the transmission interval of RI is $N_{pd} \times M_{RI}$, and its offset is $N_{OFFSET,CQI} + N_{OFFSET,RI}$.

Figure 4:
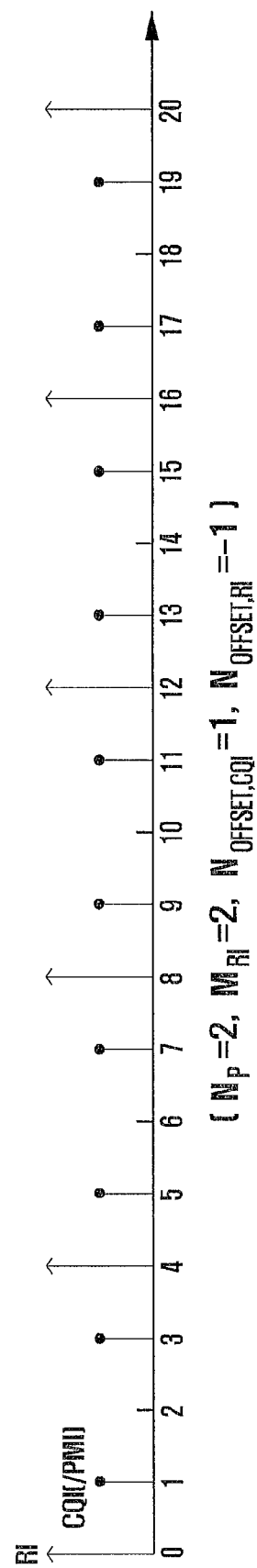
FIG. 4 is a diagram illustrating feedback timings of channel state information in the channel state information transmission method according to an embodiment of the present disclosure.

FIG. 4 is a diagram illustrating feedback timings of channel state information in the channel state information transmission method according to an embodiment of the present disclosure, especially the feedback timings of RI and wCQI when $N_{pd}=2$, $M_{RI}=2$, $N_{OFFSET,CQI}=1$, and $N_{OFFSET,RI}=-1$. Here, the timing is represented by a subframe index. The feedback mode 1-1 is identical to the feedback mode 1-0 with the exception that the PMI is transmitted along with the wCQI at the wCQI transmission timing. In the feedback mode 2-0, the feedback interval of the sCQI is $N_{pd}$ and the offset value is $N_{OFFSET,CQI}$. The feedback interval of wCQI is $H \times N_{pd}$ and the offset value is $N_{OFFSET,CQI}$ identical to that of the sCQI. Here, $H=J \times K+1$ where K is transmitted through higher layer signaling and J is a value determined depending on the system bandwidth. For example, J is set to 3 in the 10 MHz system. As a consequence, wCQI is transmitted at every H sCQI intervals instead of sCQI. The feedback interval of RI is $M_{RI} \times H \times N_{pd}$ and its offset is $N_{OFFSET,CQI} + N_{OFFSET,RI}$. FIG. 4 shows the feedback timings of RI, sCQI, and wCQI when $N_{pd}=2$, $M_{RI}=2$, J=3 (10 MHz), K=1, $N_{OFFSET,CQI}=1$ and $N_{OFFSET,RI}=-1$. The feedback mode 2-1 is identical to the mode 2-0 with the exception that PMI is transmitted along with the wCQI timing at the same time.

The above description is directed to the case that the number of CSI-RS antenna ports is equal to or less than 4 but, in the case that the number of CSI-RS antenna ports is 8, two types of PMI have to be fed back. The feedback mode 1-1 is divided into two submodes for 8 CSI-RS antenna ports and, in the first submode, the first PMI is transmitted along with RI and the second PMI along with wCQI. Here, the feedback interval and offset of the wCQI and the second PMI are defined as $N_{pd}$ and $N_{OFFSET,CQI}$, and the feedback interval and offset of the RI and the first PMI are defined as $M_{RI} \times N_{pd}$ and $N_{OFFSET,CQI} + N_{OFFSET,RI}$. In the second submode, the RI is transmitted first and then the wCQI, the first PMI, and the second PMI are transmitted simultaneously.

In the feedback mode 2-1 for 8 CSI-RS antenna ports, a Precoding Type Indicator (PTI) is fed back along with RI at an interval of $M_{RI} \times H \times N_{pd}$ with the offset of $N_{OFFSET,CQI} + N_{OFFSET,RI}$. If the PTI is set to 0, the first and second PMIs and wCQI are feedback, and the wCQI and the second PMI are transmitted simultaneously at an interval of $N_{pd}$ with the offset of $N_{OFFSET,CQI}$. The interval of the first PMI is $H' \times N_{pd}$ and its offset is $N_{OFFSET,CQI}$. Here, H' denotes a higher layer signal. Otherwise, if the PTI is set to 1, the PTI and the RI are transmitted simultaneously, the wCQI and the second PMI are transmitted simultaneously, and the sCQI is fed back additionally. In this case, the first PMI is not transmitted. The feedback interval and offset of the PTI and RI are identical to those in the case that PTI is 0, and the interval and offset of sCQI are defined as $N_{pd}$ and $N_{OFFSET,CQI}$ respectively.

Figure 5:
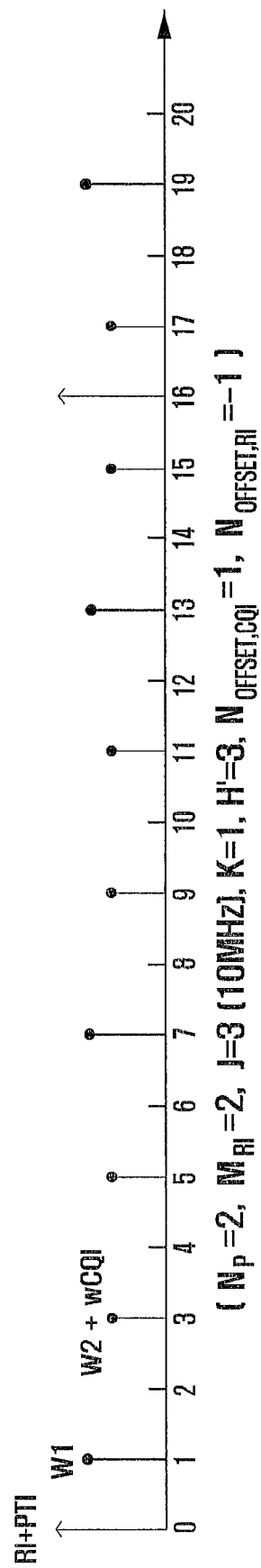
FIG. 5 is a diagram illustrating feedback timings of the channel state information in the channel state information transmission method according to another embodiment of the present disclosure.
Figure 6:
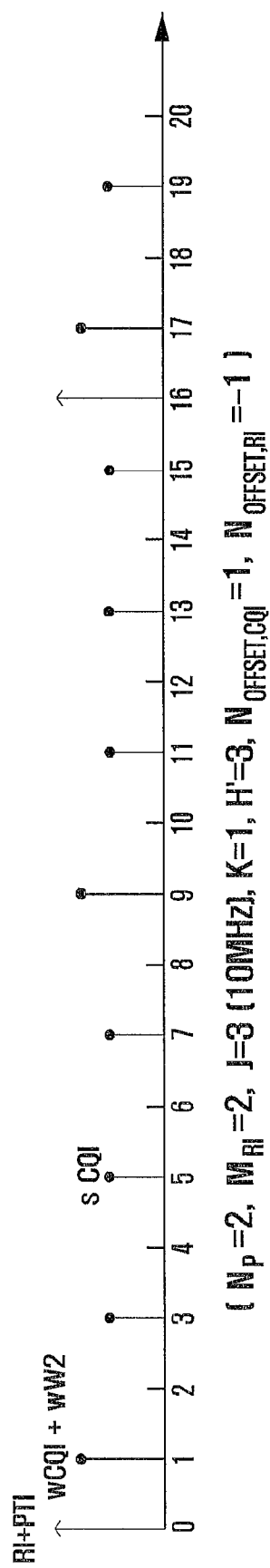
FIG. 6 is a diagram illustrating feedback timings of the channel state information in the channel state information transmission method according to still another embodiment of the present disclosure.

FIGS. 5 and 6 are diagrams illustrating feedback timings of the channel state information in the channel state information transmission method according to another embodiment of the present disclosure, especially the feedback timings when PTI=0 and PTI=1 for the case of $N_{pd}=2$, $M_{RI}=2$, J=3 (10 MHz), K=1, H'=3, $N_{OFFSET,CQI}=1$, and $N_{OFFSET,RI}=-1$.

The codebook for 4-Tx MIMO precoding for use in the legacy LTE/LTE-A system is embodied in Table 1.

The precoding matrix $W_n$ is generated in such a way of being substituted by $W_n = I - 2u_n u_n^H / u_n^H u_n$ vector. In $W_n^{\{\}}$, n denotes a codebook index, numbers in { } denote row positions of $W_n$, and the number of numbers denotes the number of ranks. The Precoding Matrix Indicator (PMI) denotes an indicator indicating a precoder in the codebook, and a total of 16 precoders exist per rank in 4 Tx MIMO transmission. Accordingly, the UE reports the index of the preferred precoder using 4-bit PMI.

TABLE 1

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{(1)}$ | $W_0^{(14)}/\sqrt{2}$ | $W_0^{(124)}/\sqrt{3}$ | $W_0^{(1234)}/\sqrt{2}$ |
| 1 | $u_1 = [1\ -j\ 1\ j]^T$ | $W_1^{(1)}$ | $W_1^{(12)}/\sqrt{2}$ | $W_1^{(123)}/\sqrt{3}$ | $W_1^{(1234)}/\sqrt{2}$ |
| 2 | $u_2 = [1\ 1\ -1\ 1]^T$ | $W_2^{(1)}$ | $W_2^{(12)}/\sqrt{2}$ | $W_2^{(123)}/\sqrt{3}$ | $W_2^{(3214)}/\sqrt{2}$ |
| 3 | $u_3 = [1\ j\ 1\ -j]^T$ | $W_3^{(1)}$ | $W_3^{(12)}/\sqrt{2}$ | $W_3^{(123)}/\sqrt{3}$ | $W_3^{(3214)}/\sqrt{2}$ |
| 4 | $u_4 = [1\ (-1-j)/\sqrt{2}\ -j\ (1-j)/\sqrt{2}]^T$ | $W_4^{(1)}$ | $W_4^{(14)}/\sqrt{2}$ | $W_4^{(124)}/\sqrt{3}$ | $W_4^{(1234)}/\sqrt{2}$ |
| 5 | $u_5 = [1\ (1-j)/\sqrt{2}\ j\ (-1-j)/\sqrt{2}]^T$ | $W_5^{(1)}$ | $W_5^{(14)}/\sqrt{2}$ | $W_5^{(124)}/\sqrt{3}$ | $W_5^{(1234)}/\sqrt{2}$ |
| 6 | $u_6 = [1\ (1+j)/\sqrt{2}\ -j\ (-1+j)/\sqrt{2}]^T$ | $W_6^{(1)}$ | $W_6^{(13)}/\sqrt{2}$ | $W_6^{(134)}/\sqrt{3}$ | $W_6^{(1324)}/\sqrt{2}$ |
| 7 | $u_7 = [1\ (-1+j)/\sqrt{2}\ j\ (1+j)/\sqrt{2}]^T$ | $W_7^{(1)}$ | $W_7^{(13)}/\sqrt{2}$ | $W_7^{(134)}/\sqrt{3}$ | $W_7^{(1324)}/\sqrt{2}$ |
| 8 | $u_8 = [1\ -1\ 1\ 1]^T$ | $W_8^{(1)}$ | $W_8^{(12)}/\sqrt{2}$ | $W_8^{(124)}/\sqrt{3}$ | $W_8^{(1234)}/\sqrt{2}$ |
| 9 | $u_9 = [1\ -j\ -1\ -j]^T$ | $W_9^{(1)}$ | $W_9^{(14)}/\sqrt{2}$ | $W_9^{(134)}/\sqrt{3}$ | $W_9^{(1234)}/\sqrt{2}$ |
| 10 | $u_{10} = [1\ 1\ 1\ -1]^T$ | $W_{10}^{(1)}$ | $W_{10}^{(13)}/\sqrt{2}$ | $W_{10}^{(123)}/\sqrt{3}$ | $W_{10}^{(1324)}/\sqrt{2}$ |
| 11 | $u_{11} = [1\ j\ -1\ j]^T$ | $W_{11}^{(1)}$ | $W_{11}^{(13)}/\sqrt{2}$ | $W_{11}^{(134)}/\sqrt{3}$ | $W_{11}^{(1324)}/\sqrt{2}$ |
| 12 | $u_{12} = [1\ -1\ -1\ 1]^T$ | $W_{12}^{(1)}$ | $W_{12}^{(12)}/\sqrt{2}$ | $W_{12}^{(123)}/\sqrt{3}$ | $W_{12}^{(1234)}/\sqrt{2}$ |
| 13 | $u_{13} = [1\ -1\ 1\ -1]^T$ | $W_{13}^{(1)}$ | $W_{13}^{(13)}/\sqrt{2}$ | $W_{13}^{(123)}/\sqrt{3}$ | $W_{13}^{(1324)}/\sqrt{2}$ |
| 14 | $u_{14} = [1\ 1\ -1\ -1]^T$ | $W_{14}^{(1)}$ | $W_{14}^{(13)}/\sqrt{2}$ | $W_{14}^{(123)}/\sqrt{3}$ | $W_{14}^{(3214)}/\sqrt{2}$ |
| 15 | $u_{15} = [1\ 1\ 1\ 1]^T$ | $W_{15}^{(1)}$ | $W_{15}^{(12)}/\sqrt{2}$ | $W_{15}^{(123)}/\sqrt{3}$ | $W_{15}^{(1234)}/\sqrt{2}$ |

Since the LTE 4 Tx MIMO transmission is performed with only 16 precoders as described above, it may be considered to use a codebook made up of more than 16 precoders to improve the performance. In the present disclosure, it is considered a top design to use a new codebook made up of more than 16 precoders. The increase in the number of precoders improves the performance, but the number of bits for 4 Tx MIMO feedback is fixed. In detail, the periodic channel state information feedback on PUCCH is resource-restricted and thus the number of bits for 4 Tx MIMO feedback is fixed. There is therefore a need of a new feedback method capable of allowing periodic channel state information reporting using a codebook having more precoders.

The present disclosure describes a new codebook including an increased number of precoders for improving performance of legacy 4 Tx MIMO transmission and a structure of a double code book used in the 8 Tx MIMO transmission of the LTE/LTE-A system as a way of increasing the number of precoders of the 4 Tx codebook.

Equations (1) to (4) shows double codebooks for use in 4-TX MIMO transmission. The precoder acquired from the double codebook is generated in the form of a combination of the first and second precoding matrices.

Equation (1) is a generalized first precoding matrix and characterized as a block diagonal matrix.

$$W_1(n) = \begin{bmatrix} X_n & 0 \\ 0 & X_n \end{bmatrix} \text{ where } n = 0, 1, \ldots, 15 \quad (1)$$

$$X_n = \begin{bmatrix} 1 & 1 & 1 & 1 \\ e^{j\frac{2\pi}{32}n} & e^{j\frac{2\pi}{32}(n+8)} & e^{j\frac{2\pi}{32}(n+16)} & e^{j\frac{2\pi}{32}(n+24)} \end{bmatrix}$$

$X_n$ has 4 rows and generates a total of 16 matrices according to the value n as defined by equation (2).

$W_1(n)$ is determined by $X_n$ included in the matrix. $X_n$ has 4 columns and 2 rows and generates a total of 16 matrices according to the value of the first precoding matrix index n. $W_1(n)$ and $X_n$ are shown in equation (2).

$$W_1(0) = \begin{bmatrix} X_0 & 0 \\ 0 & X_0 \end{bmatrix} = \begin{bmatrix} 1 & 1 & 1 & 1 & 0 & 0 & 0 & 0 \\ e^{j\frac{2\pi}{32}0} & e^{j\frac{2\pi}{32}8} & e^{j\frac{2\pi}{32}16} & e^{j\frac{2\pi}{32}24} & 0 & 0 & 0 & 0 \\ 0 & 0 & 0 & 0 & 1 & 1 & 1 & 1 \\ 0 & 0 & 0 & 0 & e^{j\frac{2\pi}{32}0} & e^{j\frac{2\pi}{32}8} & e^{j\frac{2\pi}{32}16} & e^{j\frac{2\pi}{32}24} \end{bmatrix} \quad (2)$$

$$W_1(1) = \begin{bmatrix} X_1 & 0 \\ 0 & X_1 \end{bmatrix} = \begin{bmatrix} 1 & 1 & 1 & 1 & 0 & 0 & 0 & 0 \\ e^{j\frac{2\pi}{32}1} & e^{j\frac{2\pi}{32}9} & e^{j\frac{2\pi}{32}17} & e^{j\frac{2\pi}{32}25} & 0 & 0 & 0 & 0 \\ 0 & 0 & 0 & 0 & 1 & 1 & 1 & 1 \\ 0 & 0 & 0 & 0 & e^{j\frac{2\pi}{32}1} & e^{j\frac{2\pi}{32}9} & e^{j\frac{2\pi}{32}17} & e^{j\frac{2\pi}{32}25} \end{bmatrix}$$

$$W_1(2) = \begin{bmatrix} X_2 & 0 \\ 0 & X_2 \end{bmatrix} = \begin{bmatrix} 1 & 1 & 1 & 1 & 0 & 0 & 0 & 0 \\ e^{j\frac{2\pi}{32}2} & e^{j\frac{2\pi}{32}10} & e^{j\frac{2\pi}{32}18} & e^{j\frac{2\pi}{32}26} & 0 & 0 & 0 & 0 \\ 0 & 0 & 0 & 0 & 1 & 1 & 1 & 1 \\ 0 & 0 & 0 & 0 & e^{j\frac{2\pi}{32}2} & e^{j\frac{2\pi}{32}10} & e^{j\frac{2\pi}{32}18} & e^{j\frac{2\pi}{32}26} \end{bmatrix}$$

$$W_1(3) = \begin{bmatrix} X_3 & 0 \\ 0 & X_3 \end{bmatrix} = \begin{bmatrix} 1 & 1 & 1 & 1 & 0 & 0 & 0 & 0 \\ e^{j\frac{2\pi}{32}3} & e^{j\frac{2\pi}{32}11} & e^{j\frac{2\pi}{32}19} & e^{j\frac{2\pi}{32}27} & 0 & 0 & 0 & 0 \\ 0 & 0 & 0 & 0 & 1 & 1 & 1 & 1 \\ 0 & 0 & 0 & 0 & e^{j\frac{2\pi}{32}3} & e^{j\frac{2\pi}{32}11} & e^{j\frac{2\pi}{32}19} & e^{j\frac{2\pi}{32}27} \end{bmatrix}$$

$$W_1(4) = \begin{bmatrix} X_4 & 0 \\ 0 & X_4 \end{bmatrix} = \begin{bmatrix} 1 & 1 & 1 & 1 & 0 & 0 & 0 & 0 \\ e^{j\frac{2\pi}{32}4} & e^{j\frac{2\pi}{32}12} & e^{j\frac{2\pi}{32}20} & e^{j\frac{2\pi}{32}28} & 0 & 0 & 0 & 0 \\ 0 & 0 & 0 & 0 & 1 & 1 & 1 & 1 \\ 0 & 0 & 0 & 0 & e^{j\frac{2\pi}{32}4} & e^{j\frac{2\pi}{32}12} & e^{j\frac{2\pi}{32}20} & e^{j\frac{2\pi}{32}28} \end{bmatrix}$$

$$W_1(5) = \begin{bmatrix} X_5 & 0 \\ 0 & X_5 \end{bmatrix} = \begin{bmatrix} 1 & 1 & 1 & 1 & 0 & 0 & 0 & 0 \\ e^{j\frac{2\pi}{32}5} & e^{j\frac{2\pi}{32}13} & e^{j\frac{2\pi}{32}21} & e^{j\frac{2\pi}{32}29} & 0 & 0 & 0 & 0 \\ 0 & 0 & 0 & 0 & 1 & 1 & 1 & 1 \\ 0 & 0 & 0 & 0 & e^{j\frac{2\pi}{32}5} & e^{j\frac{2\pi}{32}13} & e^{j\frac{2\pi}{32}21} & e^{j\frac{2\pi}{32}29} \end{bmatrix}$$

-continued $$W_1(6) = \begin{bmatrix} X_6 & 0 \\ 0 & X_6 \end{bmatrix} = \begin{bmatrix} 1 & 1 & 1 & 1 & 0 & 0 & 0 & 0 \\ e^{j\frac{2\pi}{32}6} & e^{j\frac{2\pi}{32}14} & e^{j\frac{2\pi}{32}22} & e^{j\frac{2\pi}{32}30} & 0 & 0 & 0 & 0 \\ 0 & 0 & 0 & 0 & 1 & 1 & 1 & 1 \\ 0 & 0 & 0 & 0 & e^{j\frac{2\pi}{32}6} & e^{j\frac{2\pi}{32}14} & e^{j\frac{2\pi}{32}22} & e^{j\frac{2\pi}{32}30} \end{bmatrix}$$

$$W_1(7) = \begin{bmatrix} X_7 & 0 \\ 0 & X_7 \end{bmatrix} = \begin{bmatrix} 1 & 1 & 1 & 1 & 0 & 0 & 0 & 0 \\ e^{j\frac{2\pi}{32}7} & e^{j\frac{2\pi}{32}15} & e^{j\frac{2\pi}{32}23} & e^{j\frac{2\pi}{32}31} & 0 & 0 & 0 & 0 \\ 0 & 0 & 0 & 0 & 1 & 1 & 1 & 1 \\ 0 & 0 & 0 & 0 & e^{j\frac{2\pi}{32}7} & e^{j\frac{2\pi}{32}15} & e^{j\frac{2\pi}{32}23} & e^{j\frac{2\pi}{32}31} \end{bmatrix}$$

$$W_1(8) = \begin{bmatrix} X_8 & 0 \\ 0 & X_8 \end{bmatrix} = \begin{bmatrix} 1 & 1 & 1 & 1 & 0 & 0 & 0 & 0 \\ e^{j\frac{2\pi}{32}8} & e^{j\frac{2\pi}{32}16} & e^{j\frac{2\pi}{32}24} & e^{j\frac{2\pi}{32}0} & 0 & 0 & 0 & 0 \\ 0 & 0 & 0 & 0 & 1 & 1 & 1 & 1 \\ 0 & 0 & 0 & 0 & e^{j\frac{2\pi}{32}8} & e^{j\frac{2\pi}{32}16} & e^{j\frac{2\pi}{32}24} & e^{j\frac{2\pi}{32}0} \end{bmatrix}$$

$$W_1(9) = \begin{bmatrix} X_9 & 0 \\ 0 & X_9 \end{bmatrix} = \begin{bmatrix} 1 & 1 & 1 & 1 & 0 & 0 & 0 & 0 \\ e^{j\frac{2\pi}{32}9} & e^{j\frac{2\pi}{32}17} & e^{j\frac{2\pi}{32}25} & e^{j\frac{2\pi}{32}1} & 0 & 0 & 0 & 0 \\ 0 & 0 & 0 & 0 & 1 & 1 & 1 & 1 \\ 0 & 0 & 0 & 0 & e^{j\frac{2\pi}{32}9} & e^{j\frac{2\pi}{32}17} & e^{j\frac{2\pi}{32}25} & e^{j\frac{2\pi}{32}1} \end{bmatrix}$$

$$W_1(10) = \begin{bmatrix} X_{10} & 0 \\ 0 & X_{10} \end{bmatrix} = \begin{bmatrix} 1 & 1 & 1 & 1 & 0 & 0 & 0 & 0 \\ e^{j\frac{2\pi}{32}10} & e^{j\frac{2\pi}{32}18} & e^{j\frac{2\pi}{32}26} & e^{j\frac{2\pi}{32}2} & 0 & 0 & 0 & 0 \\ 0 & 0 & 0 & 0 & 1 & 1 & 1 & 1 \\ 0 & 0 & 0 & 0 & e^{j\frac{2\pi}{32}10} & e^{j\frac{2\pi}{32}18} & e^{j\frac{2\pi}{32}26} & e^{j\frac{2\pi}{32}2} \end{bmatrix}$$

$$W_1(11) = \begin{bmatrix} X_{11} & 0 \\ 0 & X_{11} \end{bmatrix} = \begin{bmatrix} 1 & 1 & 1 & 1 & 0 & 0 & 0 & 0 \\ e^{j\frac{2\pi}{32}11} & e^{j\frac{2\pi}{32}19} & e^{j\frac{2\pi}{32}27} & e^{j\frac{2\pi}{32}3} & 0 & 0 & 0 & 0 \\ 0 & 0 & 0 & 0 & 1 & 1 & 1 & 1 \\ 0 & 0 & 0 & 0 & e^{j\frac{2\pi}{32}11} & e^{j\frac{2\pi}{32}19} & e^{j\frac{2\pi}{32}27} & e^{j\frac{2\pi}{32}3} \end{bmatrix}$$

$$W_1(12) = \begin{bmatrix} X_{12} & 0 \\ 0 & X_{12} \end{bmatrix} = \begin{bmatrix} 1 & 1 & 1 & 1 & 0 & 0 & 0 & 0 \\ e^{j\frac{2\pi}{32}12} & e^{j\frac{2\pi}{32}20} & e^{j\frac{2\pi}{32}28} & e^{j\frac{2\pi}{32}4} & 0 & 0 & 0 & 0 \\ 0 & 0 & 0 & 0 & 1 & 1 & 1 & 1 \\ 0 & 0 & 0 & 0 & e^{j\frac{2\pi}{32}12} & e^{j\frac{2\pi}{32}20} & e^{j\frac{2\pi}{32}28} & e^{j\frac{2\pi}{32}4} \end{bmatrix}$$

$$W_1(13) = \begin{bmatrix} X_{13} & 0 \\ 0 & X_{13} \end{bmatrix} = \begin{bmatrix} 1 & 1 & 1 & 1 & 0 & 0 & 0 & 0 \\ e^{j\frac{2\pi}{32}13} & e^{j\frac{2\pi}{32}21} & e^{j\frac{2\pi}{32}29} & e^{j\frac{2\pi}{32}5} & 0 & 0 & 0 & 0 \\ 0 & 0 & 0 & 0 & 1 & 1 & 1 & 1 \\ 0 & 0 & 0 & 0 & e^{j\frac{2\pi}{32}13} & e^{j\frac{2\pi}{32}21} & e^{j\frac{2\pi}{32}29} & e^{j\frac{2\pi}{32}5} \end{bmatrix}$$

$$W_1(14) = \begin{bmatrix} X_{14} & 0 \\ 0 & X_{14} \end{bmatrix} = \begin{bmatrix} 1 & 1 & 1 & 1 & 0 & 0 & 0 & 0 \\ e^{j\frac{2\pi}{32}14} & e^{j\frac{2\pi}{32}22} & e^{j\frac{2\pi}{32}30} & e^{j\frac{2\pi}{32}6} & 0 & 0 & 0 & 0 \\ 0 & 0 & 0 & 0 & 1 & 1 & 1 & 1 \\ 0 & 0 & 0 & 0 & e^{j\frac{2\pi}{32}14} & e^{j\frac{2\pi}{32}22} & e^{j\frac{2\pi}{32}30} & e^{j\frac{2\pi}{32}6} \end{bmatrix}$$

$$W_1(15) = \begin{bmatrix} X_{15} & 0 \\ 0 & X_{15} \end{bmatrix} = \begin{bmatrix} 1 & 1 & 1 & 1 & 0 & 0 & 0 & 0 \\ e^{j\frac{2\pi}{32}15} & e^{j\frac{2\pi}{32}23} & e^{j\frac{2\pi}{32}31} & e^{j\frac{2\pi}{32}7} & 0 & 0 & 0 & 0 \\ 0 & 0 & 0 & 0 & 1 & 1 & 1 & 1 \\ 0 & 0 & 0 & 0 & e^{j\frac{2\pi}{32}15} & e^{j\frac{2\pi}{32}23} & e^{j\frac{2\pi}{32}31} & e^{j\frac{2\pi}{32}7} \end{bmatrix}$$

Equation (3) is a generalized second precoding matrix for use in rank 1 transmission.

$$W_2(m) \in \left\{ \frac{1}{\sqrt{2}} \begin{bmatrix} Y \\ \alpha(i)Y \end{bmatrix}, \frac{1}{\sqrt{2}} \begin{bmatrix} Y \\ j\alpha(i)Y \end{bmatrix}, \frac{1}{\sqrt{2}} \begin{bmatrix} Y \\ -\alpha(i)Y \end{bmatrix}, \frac{1}{\sqrt{2}} \begin{bmatrix} Y \\ -j\alpha(i)Y \end{bmatrix} \right\} \quad (3)$$

and $Y = e_i \in \{e_1, e_2, e_3, e_4\}$ and $\alpha(i) = e^{j\frac{2\pi}{32}2(i-1)}$ where, $m = 0, 1, 2, \ldots, 15$ $e_i$ denotes a column vector of which the $i^{th}$ element is 1 but the other 3 elements are 0 in the form of $$e_i \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

and works as a column selection vector for selecting a column of the first precoder.

$W_2(m)$ includes 2 $e_i$s on one column in 2×1 format.

Among them, the bottom $e_i$ is reflected in 0, 90, 180, and 270 degree phase shifts. This is to improve the reception performance of the terminal by reflecting the channel difference occurring due to the polarization of the first and second antennas and the polarization of the third and fourth antennas of the 4 Tx antenna structure of the eNB in advance in precoding. $\alpha(i)$ acts as a role for additional phase shifting according to the column vector selected by $e_i$. That is, when i=1, $e_i=e_1$ and $\alpha(1)=1$; when i=2, $e_i=e_2$, and $$\alpha(2) = e^{j\frac{2\pi}{32}2};$$

when i=3, $e_i=e_3$ and $$\alpha(3) = e^{j\frac{2\pi}{32}4};$$

and when i=4, $e_i=e_4$ and $$\alpha(2) = e^{j\frac{2\pi}{32}6}.$$

Accordingly, in order to indicate the precoding matrix generated by $W_2(m)$, four phase shift cases and four $e_i$ cases, resulting in a total of 16 indices, i.e. m=0, 1, 2, ..., 15, and total 4 bits for information region. The second precoder matrix $W_2(m)$ is numbered, i.e., indexed, in an order of the 4 phase shift cases with the application of the first column selection vector $e_1$ and then the 4 phase shift cases with the application of the second column vector $e_2$. This is the same for the third and fourth column selection vectors $e_3$ and $e_4$.

Equation (4) shows the matrices generated for 16 $W_2(m)$ matrices as the index m changes from 0 to 15.

$$W_2(0) = \frac{1}{\sqrt{2}} \begin{bmatrix} Y \\ \alpha(1)Y \end{bmatrix} \text{ where } Y = e_1 \quad (4)$$

$$W_2(1) = \frac{1}{\sqrt{2}} \begin{bmatrix} Y \\ j\alpha(1)Y \end{bmatrix} \text{ where } Y = e_1$$

$$W_2(2) = \frac{1}{\sqrt{2}} \begin{bmatrix} Y \\ -\alpha(1)Y \end{bmatrix} \text{ where } Y = e_1$$

$$W_2(3) = \frac{1}{\sqrt{2}} \begin{bmatrix} Y \\ -j\alpha(1)Y \end{bmatrix} \text{ where } Y = e_1$$

$$W_2(4) = \frac{1}{\sqrt{2}} \begin{bmatrix} Y \\ \alpha(2)Y \end{bmatrix} \text{ where } Y = e_2$$

$$W_2(5) = \frac{1}{\sqrt{2}} \begin{bmatrix} Y \\ j\alpha(2)Y \end{bmatrix} \text{ where } Y = e_2$$

$$W_2(6) = \frac{1}{\sqrt{2}} \begin{bmatrix} Y \\ -\alpha(2)Y \end{bmatrix} \text{ where } Y = e_2$$

$$W_2(7) = \frac{1}{\sqrt{2}} \begin{bmatrix} Y \\ -j\alpha(2)Y \end{bmatrix} \text{ where } Y = e_2$$

$$W_2(8) = \frac{1}{\sqrt{2}} \begin{bmatrix} Y \\ \alpha(3)Y \end{bmatrix} \text{ where } Y = e_3$$

$$W_2(9) = \frac{1}{\sqrt{2}} \begin{bmatrix} Y \\ j\alpha(3)Y \end{bmatrix} \text{ where } Y = e_3$$

$$W_2(10) = \frac{1}{\sqrt{2}} \begin{bmatrix} Y \\ -\alpha(3)Y \end{bmatrix} \text{ where } Y = e_3$$

$$W_2(11) = \frac{1}{\sqrt{2}} \begin{bmatrix} Y \\ -j\alpha(3)Y \end{bmatrix} \text{ where } Y = e_3$$

$$W_2(12) = \frac{1}{\sqrt{2}} \begin{bmatrix} Y \\ \alpha(4)Y \end{bmatrix} \text{ where } Y = e_4$$

$$W_2(13) = \frac{1}{\sqrt{2}} \begin{bmatrix} Y \\ j\alpha(4)Y \end{bmatrix} \text{ where } Y = e_4$$

$$W_2(14) = \frac{1}{\sqrt{2}} \begin{bmatrix} Y \\ -\alpha(4)Y \end{bmatrix} \text{ where } Y = e_4$$

$$W_2(15) = \frac{1}{\sqrt{2}} \begin{bmatrix} Y \\ -j\alpha(4)Y \end{bmatrix} \text{ where } Y = e_4$$

where, $\alpha(i) = e^{j\frac{2\pi}{32}2(i-1)}$ (5)

Equations (5) and (6) are the generalized second precoding matrix at rank 2. In rank 2 precoding, equation (5) or (6) may be used as the generalized formula for generating the second precoding matrix $W_2(m)$.

$$W_2(m) \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}$$

and $(Y_1, Y_2) = (e_i, e_k) \in \{(e_1, e_1), (e_2, e_2), (e_3, e_3), (e_4, e_4), (e_1, e_2), (e_2, e_3), (e_1, e_4), (e_2, e_4)\}$ $$W_2(m) \in \left\{ \frac{1}{2}\begin{bmatrix} Y_1 & Y_2 \\ Y_1 & Y_2 \end{bmatrix}, \frac{1}{2}\begin{bmatrix} Y_1 & Y_2 \\ Y_1 & -Y_2 \end{bmatrix}, \frac{1}{2}\begin{bmatrix} Y_1 & Y_2 \\ -Y_1 & -Y_2 \end{bmatrix}, \frac{1}{2}\begin{bmatrix} Y_1 & Y_2 \\ -Y_1 & -Y_2 \end{bmatrix} \right\} (Y_1, Y_2) \in \{(e_2, e_4)\}$$

and $$W_2(m) \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\} (Y_1, Y_2) \in \{(e_1, e_1), (e_2, e_2), (e_3, e_3), (e_4, e_4)\}$$

and $$W_2(m) \in \left\{ \frac{1}{2}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$ (6)

The first column of the second precoding matrix $W_2(m)$ is precoded into the first data stream, and the second column is precoded into the second data stream. In order to suppress the interference between the two data streams, two columns of the precoding matrix may be orthogonal. Orthogonality denotes the characteristic in which the multiplication of the same vector outputs a specific result value but multiplication of different vector results in 0.

In rank 2, the numbering (indexing) of the second precoder matrix $W_2(m)$ is performed as in the rank 1. For the first column selection vector, the numbering is performed for the phase shift with priority and then the column vector.

Equation (7) shows the matrices generated as the index m changes from 0 to 15 when equation (5) is selected as a general formula of the second precoder matrix.

$$W_2(0) = \frac{1}{2}\begin{bmatrix} Y_1 & Y_2 \\ Y_1 & -Y_2 \end{bmatrix} \text{ where, } (Y_1, Y_2) = (e_1, e_1)$$ (7)

$$W_2(1) = \frac{1}{2}\begin{bmatrix} Y_1 & Y_2 \\ jY_1 & -jY_2 \end{bmatrix} \text{ where, } (Y_1, Y_2) = (e_1, e_1)$$

$$W_2(2) = \frac{1}{2}\begin{bmatrix} Y_1 & Y_2 \\ Y_1 & -Y_2 \end{bmatrix} \text{ where, } (Y_1, Y_2) = (e_2, e_2)$$

$$W_2(3) = \frac{1}{2}\begin{bmatrix} Y_1 & Y_2 \\ jY_1 & -jY_2 \end{bmatrix} \text{ where, } (Y_1, Y_2) = (e_2, e_2)$$

$$W_2(4) = \frac{1}{2}\begin{bmatrix} Y_1 & Y_2 \\ Y_1 & -Y_2 \end{bmatrix} \text{ where, } (Y_1, Y_2) = (e_3, e_3)$$

$$W_2(5) = \frac{1}{2}\begin{bmatrix} Y_1 & Y_2 \\ jY_1 & -jY_2 \end{bmatrix} \text{ where, } (Y_1, Y_2) = (e_3, e_3)$$

$$W_2(6) = \frac{1}{2}\begin{bmatrix} Y_1 & Y_2 \\ Y_1 & -Y_2 \end{bmatrix} \text{ where, } (Y_1, Y_2) = (e_4, e_4)$$

$$W_2(7) = \frac{1}{2}\begin{bmatrix} Y_1 & Y_2 \\ jY_1 & -jY_2 \end{bmatrix} \text{ where, } (Y_1, Y_2) = (e_4, e_4)$$

$$W_2(8) = \frac{1}{2}\begin{bmatrix} Y_1 & Y_2 \\ Y_1 & -Y_2 \end{bmatrix} \text{ where, } (Y_1, Y_2) = (e_1, e_2)$$

$$W_2(9) = \frac{1}{2}\begin{bmatrix} Y_1 & Y_2 \\ jY_1 & -jY_2 \end{bmatrix} \text{ where, } (Y_1, Y_2) = (e_1, e_2)$$

$$W_2(10) = \frac{1}{2}\begin{bmatrix} Y_1 & Y_2 \\ Y_1 & -Y_2 \end{bmatrix} \text{ where, } (Y_1, Y_2) = (e_2, e_3)$$

-continued $$W_2(11) = \frac{1}{2}\begin{bmatrix} Y_1 & Y_2 \\ jY_1 & -jY_2 \end{bmatrix} \text{ where, } (Y_1, Y_2) = (e_2, e_3)$$

$$W_2(12) = \frac{1}{2}\begin{bmatrix} Y_1 & Y_2 \\ Y_1 & -Y_2 \end{bmatrix} \text{ where, } (Y_1, Y_2) = (e_1, e_4)$$

$$W_2(13) = \frac{1}{2}\begin{bmatrix} Y_1 & Y_2 \\ jY_1 & -jY_2 \end{bmatrix} \text{ where, } (Y_1, Y_2) = (e_1, e_4)$$

$$W_2(14) = \frac{1}{2}\begin{bmatrix} Y_1 & Y_2 \\ Y_1 & -Y_2 \end{bmatrix} \text{ where, } (Y_1, Y_2) = (e_2, e_4)$$

$$W_2(15) = \frac{1}{2}\begin{bmatrix} Y_1 & Y_2 \\ jY_1 & -jY_2 \end{bmatrix} \text{ where, } (Y_1, Y_2) = (e_2, e_4)$$

Equation (8) shows the matrices generated as the index m changes from 0 to 15 when equation (6) is selected as the general formula of the second precoder matrix.

$$W_2(0) = \frac{1}{2}\begin{bmatrix} Y_1 & Y_2 \\ Y_1 & Y_2 \end{bmatrix} \text{ where, } (Y_1, Y_2) = (e_2, e_4)$$ (8)

$$W_2(1) = \frac{1}{2}\begin{bmatrix} Y_1 & Y_2 \\ Y_1 & -Y_2 \end{bmatrix} \text{ where, } (Y_1, Y_2) = (e_2, e_4)$$

$$W_2(2) = \frac{1}{2}\begin{bmatrix} Y_1 & Y_2 \\ -Y_1 & Y_2 \end{bmatrix} \text{ where, } (Y_1, Y_2) = (e_2, e_4)$$

$$W_2(3) = \frac{1}{2}\begin{bmatrix} Y_1 & Y_2 \\ -Y_1 & -Y_2 \end{bmatrix} \text{ where, } (Y_1, Y_2) = (e_2, e_4)$$

$$W_2(4) = \frac{1}{2}\begin{bmatrix} Y_1 & Y_2 \\ Y_1 & -Y_2 \end{bmatrix} \text{ where, } (Y_1, Y_2) = (e_1, e_1)$$

$$W_2(5) = \frac{1}{2}\begin{bmatrix} Y_1 & Y_2 \\ jY_1 & -jY_2 \end{bmatrix} \text{ where, } (Y_1, Y_2) = (e_1, e_1)$$

$$W_2(6) = \frac{1}{2}\begin{bmatrix} Y_1 & Y_2 \\ Y_1 & -Y_2 \end{bmatrix} \text{ where, } (Y_1, Y_2) = (e_2, e_2)$$

-continued $$W_2(7) = \frac{1}{2}\begin{bmatrix} Y_1 & Y_2 \\ jY_1 & -jY_2 \end{bmatrix} \text{ where, } (Y_1, Y_2) = (e_2, e_2)$$

$$W_2(8) = \frac{1}{2}\begin{bmatrix} Y_1 & Y_2 \\ Y_1 & -Y_2 \end{bmatrix} \text{ where, } (Y_1, Y_2) = (e_3, e_3)$$

$$W_2(9) = \frac{1}{2}\begin{bmatrix} Y_1 & Y_2 \\ jY_1 & -jY_2 \end{bmatrix} \text{ where, } (Y_1, Y_2) = (e_3, e_3)$$

$$W_2(10) = \frac{1}{2}\begin{bmatrix} Y_1 & Y_2 \\ Y_1 & -Y_2 \end{bmatrix} \text{ where, } (Y_1, Y_2) = (e_4, e_4)$$

$$W_2(11) = \frac{1}{2}\begin{bmatrix} Y_1 & Y_2 \\ jY_1 & -jY_2 \end{bmatrix} \text{ where, } (Y_1, Y_2) = (e_4, e_4)$$

$$W_2(12) = \frac{1}{2}\begin{bmatrix} Y_1 & Y_2 \\ Y_2 & -Y_1 \end{bmatrix} \text{ where, } (Y_1, Y_2) = (e_1, e_3)$$

$$W_2(13) = \frac{1}{2}\begin{bmatrix} Y_1 & Y_2 \\ Y_2 & -Y_1 \end{bmatrix} \text{ where, } (Y_1, Y_2) = (e_2, e_4)$$

$$W_2(14) = \frac{1}{2}\begin{bmatrix} Y_1 & Y_2 \\ Y_2 & -Y_1 \end{bmatrix} \text{ where, } (Y_1, Y_2) = (e_3, e_1)$$

$$W_2(15) = \frac{1}{2}\begin{bmatrix} Y_1 & Y_2 \\ Y_2 & -Y_1 \end{bmatrix} \text{ where } (Y_1, Y_2) = (e_4, e_2)$$

It is considered to use the double code book in 4-Tx MIMO transmission as in the periodic channel state information feedback in B Tx MIMO transmission. In order to check the channel state, the transmits reference signals such as CSI-RS, and the UE generates downlink channel feedback information such as Rank Indicator (RI), Channel Quality Indicator (CQI), and Precoding Matrix Indicator (PMI), and transmits the feedback information to the eNB. The periodic feedback of UE is performed on Physical Uplink Control Channel (PUCCH) in one of four modes as follows:

1. Mode 1-0: RI, wideband CQI (wCQI)
2. Mode 1-1: RI, wCQI, wideband PMI (wPMI)
  2-1. 4 CSI-RS antenna ports are configured
   2-1-1. submode 1: jointly encoded RI and first PMI
   2-1-2. submode 2: wCQI, first PMI, second PMI
3. mode 2-0: RI, wCQI, subband CQI (sCQI),
4. mode 2-1: RI, wCQI, wPMI, sCQI, sPMI The feedback timings of the individual feedback information are determined based on $N_{pd}$, $N_{OFFSET,CQI}$, $M_{RI}$, and $N_{OFFSET,RI}$ transmitted through higher layer signaling. In the feedback mode 1-0, the transmission interval of wCQI is $N_{pd}$, which is determined based on the subframe offset value of $N_{OFFSET,CQI}$. Also, the transmission interval of RI is $N_{pd} \times M_{RI}$, and its offset is $N_{OFFSET,CQI}+N_{OFFSET,RI}$.

FIG. 4 is a diagram illustrating feedback timings of channel state information in the channel state information transmission method according to an embodiment of the present disclosure, especially the feedback timings of RI and wCQI when $N_{pd}=2$, $M_{RI}=2$, $N_{OFFSET,CQI}=1$, and $N_{OFFSET,RI}=-1$. Here, the timing is represented by a subframe index. In the feedback mode 2-0, the feedback interval of the sCQI is $N_{pd}$ and the offset value is $N_{OFFSET,CQI}$. The feedback interval of wCQI is $H \times N_{pd}$ and the offset value is $N_{OFFSET,CQI}$ identical to that of the sCQI. Here, $H=J \times K+1$ where K is transmitted through higher layer signaling, and J is a valued determined depending on the system bandwidth. For example, J is set to 3 in the 10 MHz system. As a consequence, wCQI is transmitted at every H sCQI intervals instead of sCQI. The feedback interval of RI is $M_{RI} \times H \times N_{pd}$ and its offset is $N_{OFFSET,CQI}+N_{OFFSET,RI}$. FIG. 4 shows the feedback timings of RI, sCQI, and wCQI when $N_{pd}=2$, $M_{RI}=2$, J=3 (10 MHz), K=1, $N_{OFFSET,CQI}=1$, and $N_{OFFSET,RI}=-1$.

As the two PMIs of the double codebook are fed back in the 4 Tx MIMO transmission, the feedback mode 1-1 is divided into two submodes and, in the first submode, the first PMI is transmitted along with RI and the second PMI along with wCQI. Here, the feedback interval and offset of the wCQI and the second PMI are defined as $N_{pd}$ and $N_{OFFSET,CQI}$ and the feedback interval and offset of the RI and the first PMI are defined as $M_{RI} \times N_{pd}$ and $N_{OFFSET,CQI}+N_{OFFSET,RI}$. In the second submode, the RI is transmitted first and then the wCQI, the first PMI, and the second PMI are transmitted simultaneously.

In the feedback mode 2-1, a Precoding Type Indicator (PTI) is fed back along with RI at an interval of $M_{RI} \times H \times N_{pd}$ with the offset of $N_{OFFSET,CQI}+N_{OFFSET,RI}$. If the PTI is set to 0, the first and second PMIs and wCQI are feedback, and the wCQI and the second PMI are transmitted simultaneously at an interval of $N_{pd}$ with the offset of $N_{OFFSET,CQI}$. The interval of the first PMI is $H' \times N_{pd}$ and its offset is $N_{OFFSET,CQI}$. Here, H' denotes a higher layer signal. Otherwise, if the PTI is set to 1, the PTI and the RI are transmitted simultaneously, the wCQI and the second PMI are transmitted simultaneously, and the sCQI is fed back additionally. In this case, the first PMI is not transmitted. The feedback interval and offset of the PTI and RI are identical with those in the case that PTI is 0, and the interval and offset of sCQI are defined as $N_{pd}$ and $N_{OFFSET,CQI}$ respectively.

FIGS. 5 and 6 are diagrams illustrating feedback timings of the channel state information in the channel state information transmission method according to another embodiment of the present disclosure, especially the feedback timings when PTI=0 and PTI=1 for the case of $N_{pd}=2$, $M_{RI}=2$, J=3 (10 MHz), K=1, H'=3, $N_{OFFSET,CQI}=1$, and $N_{OFFSET,RI}=-1$.

In the LTE/LTE-A system, the channel state information is reported in Mode 1-1, mode 2-0, Mode 1-1, or mode 2-1 depending on the property of the feedback information, and up to 11 bits are allocated as an information region on the uplink channel PUCCH for CQI and PMI transmission. The mode 1-1 is divided into the submode 1 in which the RI and the first PMI are transmitted as joint-coded and the submode 2 in which the wCQI and the first and second PMIs are transmitted simultaneously. As described above, the PMI and CQI may be interpreted differently depending on the RI and thus the reliability of RI is very important. In order to increase the reliability of RI in the submode 1, a method of reducing the number of bits by applying a codebook subsampling for transmitting a part of the first PMI to the joint-encoding of the RI and the first PMI is used, and the problem of the submode 2 in which the total information amount of the wCQI and the first and second PMIs exceeds 11 bits is solved with the codebook subsampling. In mode 2-1, when RI=1, the wCQI and the PMI are allocated 4 bits respectively so as to inform of all the second PMIs. In the case of RI>1, however, the information amount of CQI increases to 7 bits so as to cause a shortage of information region for all second PMIs, resulting in transmission of 2 bits using the codebook subsampling.

One of the efficient codebook subsampling methods is to reduce the number of indices for indicating the precoders of the codebook by excluding the precoders appearing repeatedly in the entire codebook.

By substituting 0 to 15 for n of equation (1), it is possible to acquire 16 matrices as shown in equation (2). In equation (2), it is shown that the matrices include the same column vectors, when n=0, n=8, n=1, and n=9, with the exception that the column vectors are arranged differently in position. Accordingly, the subsampling is applied to only the matrices of n=0 to n=7, it is possible to show all the columns belonging to the original $W_1$.

The codebook subsampling method according to an embodiment of the present disclosure is described in more detail.

The first embodiment of the present disclosure is directed to the submode 1 of the feedback Mode 1-1. In the submode 1 of the feedback Mode 1-1, the RI and the first PMI are jointly coded for transmission. Since the PMI is generated based on the RI and the CO is calculated based on the PMI, high reliability of the RI is required in channel state information feedback. The reliability of RI can be increased by reducing the number of bits of the first PMI through codebook subsampling in the process of jointly encoding the RI and the first PMI.

An embodiment 1-1 of the present disclosure proposes a codebook subsampling with 8 consecutive indices among the precoding matrices of $W_1(n)$ at ranks 1 and 2. Examples of this include $n \in \{0,1,2,3,4,5,6,7\}$, $n \in \{8,9,10,11,12,13,14,15\}$, $n \in \{4,5,6,7,8,9,10,11\}$, and $n \in \{12,1,3,14,15,0,1,2,3\}$. The present disclosure may include other 8 consecutive indices-based codebook subsampling. Since the transmission/reception performance is not sensitive to the precoding at ranks 3 and 4, $W_1(n)$ uses a unitary matrix, and $W_2(m)$ uses the legacy codebook. The legacy codebook is made up of a total of 16 precoders and there is no codebook subsampling problem. Table 2 arranges the codebook subsampling of $W_1(n)$ using 8 consecutive indices of n.

TABLE 2

| Rank | index n for $W_1$ |
|---|---|
| 1 | {0, 1, 2, 3, 4, 5, 6, 7} or {8, 9, 10, 11, 12, 13, 14, 15} or {4, 5, 6, 7, 8, 9, 10, 11} or {12, 13, 14, 15, 0, 1, 2, 3} |
| 2 | {0, 1, 2, 3, 4, 5, 6, 7} or {8, 9, 10, 11, 12, 13, 14, 15} or {4, 5, 6, 7, 8, 9, 10, 11} or {12, 13, 14, 15, 0, 1, 2, 3} |
| 3 | identity matrix |
| 4 | identity matrix |

In equations (1) and (2), the matrix $W_1$ forms a block diagonal matrix of $X_n$. Accordingly, $W_1$ is determined depending on the form of $X_n$. Referring to equation (2), the codebook subsampling may be performed by selecting 8 consecutive indices, e.g. $\{X_0, X_1, X_2, X_3, X_4, X_5, X_6, X_7\}$. In the case of performing the codebook subsampling as above, the matrix $W_1$, which is generated as n increases, includes all the column vector elements of the original codebook, and the vector columns are shifted in phase at an interval of $$\frac{2\pi}{32}$$

rad. This means that the UE is capable of selecting a preferred index of the precoding matrix $W_1$ densely. The subsampling also may be performed with other selection such as $\{X_8, X_9, X_{10}, X_{11}, X_{12}, X_{13}, X_{14}, X_{15}\}$ and $\{X_4, X_5, X_6, X_7, X_8, X_9, X_{10}, X_{11}\}$. In the case of $\{X_0, X_1, X_2, X_3, X_{12}, X_{13}, X_{14}, X_{15}\}$, since the phase shift progresses in the order of $X_{12}, X_{13}, X_{14}, X_{15}, X_0, X_1, X_2, X_3$ in view of the form of $X_n$ although the indices are not consecutive, it may be considered as a form of the embodiment 1-1.

An embodiment 1-2 of the present disclosure proposes a codebook subsampling with $n \in \{0,2,4,6,9,11,13,15\}$ and $n \in \{1,3,5,7,8,10,12,14\}$.

In the case of performing the codebook subsampling with the above indices, the matrices of $\{X_0, X_2, X_4, X_6, X_9, X_{11}, X_{13}, X_{15}\}$ or $\{X_1, X_3, X_5, X_7, X_8, X_{10}, X_{12}, X_{14}\}$ are block-diagonalized in $W_1(n)$.

In embodiment 1-1, as the index n of the precoding matrix $W_1$ increases, the range supportable by the precoding matrix expressed as column vectors is $$\frac{2\pi}{32}8$$

rad instead that specific column vectors are phase-shifted densely at an interval of $$\frac{2\pi}{32}$$

rad. In embodiment 1-2, however, the sub-sampled set has no recurring column vector but includes all column vectors existing in $W_1$. As n increases, the phase is shifted at an interval of $$\frac{2\pi}{16}$$

rad in view of the column vector of each position. This means that it is possible to generate the precoding matrix capable of supporting a two-fold wider angle as compared to embodiment 1-1 when the matrix of $W_2(m)$ is multiplied.

In embodiment 1-1, as the index n of the precoding matrix $W_1$ increases, the range supportable by the precoding matrix expressed as column vectors is $$\frac{2\pi}{32}8$$

rad instead that specific column vectors are phase-shifted densely at an interval of $$\frac{2\pi}{32}$$

rad. In embodiment 1-2, however, the sub-sampled set has no recurring column vector but includes all column vectors existing in $W_1$. As n increases, the phase is shifted at an interval of $$\frac{2\pi}{16}$$

rad in view of the column vector of each position. This means that it is possible to generate the precoding matrix capable of supporting a two-fold wider angle as compared to embodiment 1-1 when the matrix of $W_2(m)$ is multiplied.

TABLE 3

| Rank | index n for $W_1$ |
|---|---|
| 1 | {0, 2, 4, 6, 9, 11, 13, 15} or {1, 3, 5, 7, 8, 10, 12, 14} |
| 2 | {0, 2, 4, 6, 9, 11, 13, 15} or {1, 3, 5, 7, 8, 10, 12, 14} |

TABLE 3-continued

| Rank | index n for $W_1$ |
|---|---|
| 3 | identity matrix |
| 4 | identity matrix |

The second embodiment of the present disclosure is directed to the submode 2 of the feedback mode 1-1 in which the first precoding matrix subsampling and the second precoding matrix subsampling are performed. The subsampling of the first precoding matrix $W_1(n)$ may be performed according to the first embodiment or in a way of uniform distribution, and the subsampling of the second precoding matrix $W_2(m)$ is performed in a way of codebook subsampling based on the polarization characteristic of the transmission antenna.

As described above, in the submode 2 of the feedback mode 1-1, the wCQI and the first and second PMIs are transmitted simultaneously. When RI=1, the wCQI and the first and second PMIs are 4 bits, respectively, such that total 12 bits are required. When RI>1, 3-bit spatial differential CQI is added for two transmission blocks such that a total of 15 bits are required. In order to solve the problem that the number of bits for CQI and PMI transmission exceeds the information amount of 11 bits allocated for CQI and PMI transmission on PUCCH, it is necessary to apply the codebook subsampling even for the feedback for the 4 Tx MIMO transmission.

In the second embodiment of the present disclosure, the wCQI transmission uses 4 bits or 7 bits, where a total of 4 bits are allocated for the first and second PMIs. Among them, 3 bits are allocated to the first PMI and 1 bit is allocated for the index of $W_2(m)$. The codebook subsampling for $W_1(n)$ may be performed according to any of embodiments 1-1 and 1-2 included in the first embodiment or in a way of being uniformly distributed.

In detail, the first $W_1(n)$ subsampling method of the second embodiment is to perform the codebook subsampling by selecting 3 consecutive indices n for the first precoding matrices. Examples include n∈, n∈{8,9,10,11,12,13,14,15}, n∈{4,5,6,7,8,9,10,11}, and n∈{12,1,3,14,15,0,1,2,3}.

The second $W_1(n)$ subsampling method of the second embodiment is to select the index n such that the first precoding matrix $W_1(n)$ has uniform distribution. It is possible to generate a precoding matrix supportable in all directions uniformly by performing the subsampling of selecting the precoding matrix having the index of n∈{0,2,4,6,8,10,12,14} or n∈{1,3,5,7,9,11,13,15}. By performing the codebook subsampling in this way, it is possible to generate the precoding matrix in which the phase of the column vector is shifted at an interval of $$\frac{2\pi}{32}2$$

rad, as n increases, and thus the column vectors are arranged at a regular degree in the range from 0 to 360 degrees so as to support uniformly in all directions.

The third $W_1(n)$ subsampling method of the second embodiment is the codebook subsampling method performed with the index of the first precoding matrix $W_1(n)$, i.e., n∈{0, 2,4,6,9,11,13,15} or n∈{1,3,5,7,8,10,12,14}. This method is advantageous in that each column of $W_1(n)$ has the direction angle supportable, as n changes, and is wide as compared to the method of selecting 8 consecutive indices n. The method of selecting 8 consecutive indices n supports 0 rad direction for n=0 and $$\frac{2\pi}{32}8$$

rad for n=7. Whereas, the method of performing the codebook subsampling with n∈{0,2,4,6,9,11,13,15} supports 0 rad direction for n=0 and $$\frac{2\pi}{32}15$$

rad for n=15 so as to support a wider direction. In the case of multiplying $W_2(m)$, it is advantageous that there is no recurring column vector as compared to the method of selecting the index n to have the uniform distribution as the second method.

The $W_2(m)$ subsampling method may be performed in consideration of a phase shift of antenna polarization. At rank 1, the $W_2(m)$ subsampling is performed with a precoding matrix represented by m∈{0,2} as shown in equation (9). At rank 2, when equation (5) is used as the general formula for generating $W_2(m)$, the second precoding matrix represented by index m∈{0,1} is selected. When equation (6) is used as the general formula for generating $W_2(m)$, the second precoding matrix represented by index m∈{4,5} is selected. When equations (5) and (6) are used as the general formula, the precoding matrix is selected as equation (10).

As described above, $W_2$ which is multiplied by $W_1$ is made up of two selection vectors capable of selecting one of the columns of $W_1$. That is, $W_2$ selects two of the column vectors of $W_1$. One of the two selected columns has a function of shifting phase as much as 0, 90, 180, and 270 degrees. This makes it possible for the UE to receive the signal by combining the channel effects occurring due to difference between the polarization characteristic of the first and second antennas and the polarization characteristic of the third and fourth antennas in the 4 Tx antenna structure of the eNB. Among the characteristic of $W_2$, column selection, and polarization phase shift, the main factor influencing the performance is the polarization phase shift. Accordingly, in the second embodiment of the present disclosure, the codebook subsampling of $W_2$ is performed such that only the polarization phase shift is reflected. In detail, since there is a polarization phase shift at an interval of 90 degrees at rank 1, the subsampling is performed to only 0 and 180 degrees to make it possible to be indicated with 1 bit. At rank 2, it is structured to ensure orthogonality between higher layer signals. Since the polarization phase shift occurs only at 0 and 90 degrees and the phase shift to 180 and 270 degrees is accomplished by changing columns of $W_2$, there is no need to consider the phase of wider degree. The final equation for $W_2$ subsampling is equation (9) at rank 1 and equation (10) at rank 2.

$$W_2 \in \left\{ \frac{1}{\sqrt{2}}\begin{bmatrix} Y \\ \alpha(1)Y \end{bmatrix}, \frac{1}{\sqrt{2}}\begin{bmatrix} Y \\ -\alpha(1)Y \end{bmatrix} \right\} \text{ and } Y \in e_1 \quad (9)$$

$$W_2 \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\} \text{ and} \quad (10)$$

$$(Y_1, Y_2) = (e_1, e_1)$$

Exemplifying with rank 1, the precoder of the double codebook applied to 4 Tx MIMO transmission is generated by $W=W_1 \cdot W_2$:

$$W \in \left\{ \frac{1}{\sqrt{2}} \begin{bmatrix} X_n & 0 \\ 0 & X_n \end{bmatrix} \begin{bmatrix} e_1 \\ e_1 \end{bmatrix}, \frac{1}{\sqrt{2}} \begin{bmatrix} X_n & 0 \\ 0 & X_n \end{bmatrix} \begin{bmatrix} e_1 \\ -e_1 \end{bmatrix} \right\} = \left\{ \frac{1}{\sqrt{2}} \begin{bmatrix} X_n e_1 \\ X_n e_1 \end{bmatrix}, \frac{1}{\sqrt{2}} \begin{bmatrix} X_n e_1 \\ -X_n e_1 \end{bmatrix} \right\}.$$

Here, applying the subsampling of $W_1(n)$ with $n \in \{1,2,3,4,5,6,7\}$ of embodiment 1-1 results in:

$$W \in \left\{ \begin{bmatrix} 1 \\ e^{j\frac{2\pi}{32}0} \\ 1 \\ e^{j\frac{2\pi}{32}0} \end{bmatrix}, \begin{bmatrix} 1 \\ e^{j\frac{2\pi}{32}1} \\ 1 \\ e^{j\frac{2\pi}{32}1} \end{bmatrix}, \begin{bmatrix} 1 \\ e^{j\frac{2\pi}{32}2} \\ 1 \\ e^{j\frac{2\pi}{32}2} \end{bmatrix}, \begin{bmatrix} 1 \\ e^{j\frac{2\pi}{32}3} \\ 1 \\ e^{j\frac{2\pi}{32}3} \end{bmatrix}, \begin{bmatrix} 1 \\ e^{j\frac{2\pi}{32}4} \\ 1 \\ e^{j\frac{2\pi}{32}4} \end{bmatrix}, \begin{bmatrix} 1 \\ e^{j\frac{2\pi}{32}5} \\ 1 \\ e^{j\frac{2\pi}{32}5} \end{bmatrix}, \begin{bmatrix} 1 \\ e^{j\frac{2\pi}{32}6} \\ 1 \\ e^{j\frac{2\pi}{32}6} \end{bmatrix}, \begin{bmatrix} 1 \\ e^{j\frac{2\pi}{32}7} \\ 1 \\ e^{j\frac{2\pi}{32}7} \end{bmatrix} \right\} \text{ or}$$

$$\left\{ \begin{bmatrix} 1 \\ e^{j\frac{2\pi}{32}0} \\ -1 \\ -e^{j\frac{2\pi}{32}0} \end{bmatrix}, \begin{bmatrix} 1 \\ e^{j\frac{2\pi}{32}1} \\ -1 \\ -e^{j\frac{2\pi}{32}1} \end{bmatrix}, \begin{bmatrix} 1 \\ e^{j\frac{2\pi}{32}2} \\ -1 \\ -e^{j\frac{2\pi}{32}2} \end{bmatrix}, \begin{bmatrix} 1 \\ e^{j\frac{2\pi}{32}3} \\ -1 \\ -e^{j\frac{2\pi}{32}3} \end{bmatrix}, \begin{bmatrix} 1 \\ e^{j\frac{2\pi}{32}4} \\ -1 \\ -e^{j\frac{2\pi}{32}4} \end{bmatrix}, \begin{bmatrix} 1 \\ e^{j\frac{2\pi}{32}5} \\ -1 \\ -e^{j\frac{2\pi}{32}5} \end{bmatrix}, \begin{bmatrix} 1 \\ e^{j\frac{2\pi}{32}6} \\ -1 \\ -e^{j\frac{2\pi}{32}6} \end{bmatrix}, \begin{bmatrix} 1 \\ e^{j\frac{2\pi}{32}7} \\ -1 \\ -e^{j\frac{2\pi}{32}7} \end{bmatrix} \right\}.$$

Applying the subsampling of $W_1(n)$ with $n \in \{0,2,4,6,9,11,15\}$ of embodiment 1-2 results in:

$$W \in \left\{ \begin{bmatrix} 1 \\ e^{j\frac{2\pi}{32}0} \\ 1 \\ e^{j\frac{2\pi}{32}0} \end{bmatrix}, \begin{bmatrix} 1 \\ e^{j\frac{2\pi}{32}2} \\ 1 \\ e^{j\frac{2\pi}{32}2} \end{bmatrix}, \begin{bmatrix} 1 \\ e^{j\frac{2\pi}{32}4} \\ 1 \\ e^{j\frac{2\pi}{32}4} \end{bmatrix}, \begin{bmatrix} 1 \\ e^{j\frac{2\pi}{32}6} \\ 1 \\ e^{j\frac{2\pi}{32}6} \end{bmatrix}, \begin{bmatrix} 1 \\ e^{j\frac{2\pi}{32}9} \\ 1 \\ e^{j\frac{2\pi}{32}9} \end{bmatrix}, \begin{bmatrix} 1 \\ e^{j\frac{2\pi}{32}11} \\ 1 \\ e^{j\frac{2\pi}{32}11} \end{bmatrix}, \begin{bmatrix} 1 \\ e^{j\frac{2\pi}{32}13} \\ 1 \\ e^{j\frac{2\pi}{32}13} \end{bmatrix}, \begin{bmatrix} 1 \\ e^{j\frac{2\pi}{32}15} \\ 1 \\ e^{j\frac{2\pi}{32}15} \end{bmatrix} \right\} \text{ or}$$

$$\left\{ \begin{bmatrix} 1 \\ e^{j\frac{2\pi}{32}0} \\ -1 \\ -e^{j\frac{2\pi}{32}0} \end{bmatrix}, \begin{bmatrix} 1 \\ e^{j\frac{2\pi}{32}2} \\ -1 \\ -e^{j\frac{2\pi}{32}2} \end{bmatrix}, \begin{bmatrix} 1 \\ e^{j\frac{2\pi}{32}4} \\ -1 \\ -e^{j\frac{2\pi}{32}4} \end{bmatrix}, \begin{bmatrix} 1 \\ e^{j\frac{2\pi}{32}6} \\ -1 \\ -e^{j\frac{2\pi}{32}6} \end{bmatrix}, \begin{bmatrix} 1 \\ e^{j\frac{2\pi}{32}9} \\ -1 \\ -e^{j\frac{2\pi}{32}9} \end{bmatrix}, \begin{bmatrix} 1 \\ e^{j\frac{2\pi}{32}11} \\ -1 \\ -e^{j\frac{2\pi}{32}11} \end{bmatrix}, \begin{bmatrix} 1 \\ e^{j\frac{2\pi}{32}13} \\ -1 \\ -e^{j\frac{2\pi}{32}13} \end{bmatrix}, \begin{bmatrix} 1 \\ e^{j\frac{2\pi}{32}15} \\ -1 \\ -e^{j\frac{2\pi}{32}15} \end{bmatrix} \right\}.$$

Applying the subsampling of $W_1(n)$ with $n \in \{0,2,4,6,8,10,12,14\}$ to have uniform distribution results in:

$$W \in \left\{ \begin{bmatrix} 1 \\ e^{j\frac{2\pi}{32}0} \\ 1 \\ e^{j\frac{2\pi}{32}0} \end{bmatrix}, \begin{bmatrix} 1 \\ e^{j\frac{2\pi}{32}2} \\ 1 \\ e^{j\frac{2\pi}{32}2} \end{bmatrix}, \begin{bmatrix} 1 \\ e^{j\frac{2\pi}{32}4} \\ 1 \\ e^{j\frac{2\pi}{32}4} \end{bmatrix}, \begin{bmatrix} 1 \\ e^{j\frac{2\pi}{32}6} \\ 1 \\ e^{j\frac{2\pi}{32}6} \end{bmatrix}, \begin{bmatrix} 1 \\ e^{j\frac{2\pi}{32}8} \\ 1 \\ e^{j\frac{2\pi}{32}8} \end{bmatrix}, \begin{bmatrix} 1 \\ e^{j\frac{2\pi}{32}10} \\ 1 \\ e^{j\frac{2\pi}{32}10} \end{bmatrix}, \begin{bmatrix} 1 \\ e^{j\frac{2\pi}{32}12} \\ 1 \\ e^{j\frac{2\pi}{32}12} \end{bmatrix}, \begin{bmatrix} 1 \\ e^{j\frac{2\pi}{32}14} \\ 1 \\ e^{j\frac{2\pi}{32}14} \end{bmatrix} \right\} \text{ or}$$

$$\left\{ \begin{bmatrix} 1 \\ e^{j\frac{2\pi}{32}0} \\ -1 \\ -e^{j\frac{2\pi}{32}0} \end{bmatrix}, \begin{bmatrix} 1 \\ e^{j\frac{2\pi}{32}2} \\ -1 \\ -e^{j\frac{2\pi}{32}2} \end{bmatrix}, \begin{bmatrix} 1 \\ e^{j\frac{2\pi}{32}4} \\ -1 \\ -e^{j\frac{2\pi}{32}4} \end{bmatrix}, \begin{bmatrix} 1 \\ e^{j\frac{2\pi}{32}6} \\ -1 \\ -e^{j\frac{2\pi}{32}6} \end{bmatrix}, \begin{bmatrix} 1 \\ e^{j\frac{2\pi}{32}8} \\ -1 \\ -e^{j\frac{2\pi}{32}8} \end{bmatrix}, \begin{bmatrix} 1 \\ e^{j\frac{2\pi}{32}10} \\ -1 \\ -e^{j\frac{2\pi}{32}10} \end{bmatrix}, \begin{bmatrix} 1 \\ e^{j\frac{2\pi}{32}12} \\ -1 \\ -e^{j\frac{2\pi}{32}12} \end{bmatrix}, \begin{bmatrix} 1 \\ e^{j\frac{2\pi}{32}14} \\ -1 \\ -e^{j\frac{2\pi}{32}14} \end{bmatrix} \right\}.$$

As shown in the result, the combination of subsamplings of $W_1(n)$ and $W_2$ generates precoders at a narrow interval in embodiment 1-1 but precoders at a wide interval in embodiment 1-2. In a system having a relatively wide beam pattern, the inter-precoder interval is relatively less important and thus the precoders supporting the wide angle range as in embodiment 1-2 is advantageous. In the example where the $W_1(n)$ subsampling is applied so as to have a uniform distribution, it is shown that the precoding matrices are generated uniformly in all the directions.

Another embodiment of the codebook subsampling for PUCCH 1-1 submode 2 of the second embodiment of the present disclosure is directed to a method of allocating the information amount of 2 bits indicating the precoding matrix $W_1(n)$ and the information amount of 2 bits for indicating the precoding matrix of $W_2(m)$. Although it is preferable for the precoding matrix to support all the directions from 0 to 360 degree, it may not be possible to support all the directions due to the restriction of the information amount capable of indicating the precoding matrix. In this embodiment, the information amount of 2 bits is allocated for indicating the precoding matrices of $W_1(n)$ and $W_2(m)$, respectively, so as to generate a total of 16 precoding matrices. By arranging the 16 precoding matrices at a regular interval in the range from 0 to 360 degree, it is possible to expect the optimal performance. In order to accomplish this, it is performed to use $W_1(n)$ as a unit of 4 indices as $n \in \{0,4,8,12\}$ and select two column vectors having the phase difference of 180 degree as the index of $W_2(m)$ or perform a phase shift of 180 degrees through antenna polarization. It is possible to perform the codebook subsampling with $m \in \{0,2,8,10\}$ at rank 1 and $m \in \{0,1,4,5\}$ with the selection of equation (5) and $m \in \{4,5,8,9\}$ with the selection of equation (6) at rank 2.

In addition to the above method, the codebook subsampling can be performed in such a way of using the index $n \in \{1,5,9,13\}$, $n \in \{2,6,10,14\}$, or $n \in \{3,7,11,15\}$ $W_1(n)$ of $W_1(n)$; the index $m \in \{1,3,9,11\}$, $m \in \{4,6,12,14\}$, or $m \in \{5,7,13,15\}$ of $W_2(m)$ at rank 1, and the index $m \in \{2,3,6,7\}$ of the second precoder matrix at rank 2 when equation (5) is selected as the general formula, and the index $m \in \{6,7,10,11\}$ of the second precoder matrix at rank 2 when equation (6) is selected as the general formula. This method can be expressed as equations (11) and (12).

$$W_2 \in \left\{ \frac{1}{\sqrt{2}} \begin{bmatrix} Y \\ \alpha(i)Y \end{bmatrix}, \frac{1}{\sqrt{2}} \begin{bmatrix} Y \\ -\alpha(i)Y \end{bmatrix} \right\} \text{ and } Y \in \{e_1, e_3\} \text{ or} \quad (11)$$

$$W_2 \in \left\{ \frac{1}{\sqrt{2}} \begin{bmatrix} Y \\ j\alpha(i)Y \end{bmatrix}, \frac{1}{\sqrt{2}} \begin{bmatrix} Y \\ -j\alpha(i)Y \end{bmatrix} \right\} \text{ and } Y \in \{e_2, e_4\}$$

$$W_2 \in \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\} \text{ and} \quad (12)$$

$(Y_1, Y_2) \in \{(e_1, e_1), (e_3, e_3)\}$ or $(Y_1, Y_2) \in \{(e_2, e_2), (e_4, e_4)\}$

Since the transmission/reception performance is not sensitive to the precoding at ranks 3 and 4, it is possible to use the legacy codebook having 16 precoders.

Table 4 arranges the codebook subsampling method in which $W_1$ and $W_2$ are indicated by 3 bits and 1 bit respectively, and Table 5 arranges the codebook subsampling method in which $W_1$ and $W_2$ are indicated by 2 bits respectively.

Table 4 shows the codebook subsampling method ($W_1$: 3 bits, $W_2$: 1 bit) in PDCCH mode 1-1 submode 2 according to the second embodiment.

TABLE 4

| Rank | Index n ($W_1$) | number of bits ($W_1$) | Index m ($W_2$) | Number of bits ($W_2$) | Total number of bits |
|---|---|---|---|---|---|
| 1 | First method: {0, 1, 2, 3, 4, 5, 6, 7} or {8, 9, 10, 11, 12, 13, 14, 15} Second method:: {0, 2, 4, 6, 8, 10, 12, 14} or {1, 3, 5, 7, 9, 11, 13, 15} Third method:: {0, 2, 4, 6, 9, 11, 13, 15} or {1, 3, 5, 7, 8, 10, 12, 14} | 3 | {0, 2} | 1 | 4 |
| 2 | First method: {0, 1, 2, 3, 4, 5, 6, 7} or {8, 9, 10, 11, 12, 13, 14, 15} Second method:: {0, 2, 4, 6, 8, 10, 12, 14} or {1, 3, 5, 7, 9, 11, 13, 15} Third method:: {0, 2, 4, 6, 9, 11, 13, 15} or {1, 3, 5, 7, 8, 10, 12, 14} | 3 | Applying equation (5), {0, 1} Applying equation (6), {4, 5} | 1 | 4 |
| 3 | Unitary matrix | 0 | Use legacy codebook | 4 | 4 |
| 4 | Unitary matrix | 0 | Use legacy codebook | 4 | 4 |

Table 5 shows the codebook subsampling in PUCCH mode 1-1 submode 2 according to the second embodiment.

TABLE 5

| Rank | Index n ($W_1$) | Number of bits ($W_1$) | Index m ($W_2$) | Number of bits ($W_2$) | Total number of bits |
|---|---|---|---|---|---|
| 1 | {0, 4, 8, 12}, {1, 5, 9, 13}, {2, 6, 10, 14}, or {3, 7, 11, 15} | 2 | {0, 2, 8, 10}, {1, 3, 9, 11}, {4, 6, 12, 14}, or {5, 7, 13, 15} | 2 | 4 |
| 2 | {0, 4, 8, 12}, {1, 5, 9, 13}, {2, 6, 10, 14}, or {3, 7, 11, 15} | 2 | Applying equation (5): {0, 1, 4, 5} or {2, 3, 6, 7} Applying equation (6): {4, 5, 8, 9} or {6, 7, 10, 11} | 2 | 4 |
| 3 | Unitary matrix | 0 | Use legacy codebook | 4 | 4 |
| 4 | Unitary matrix | 0 | Use legacy codebook | 4 | 4 |

The third embodiment of the present disclosure is directed to the feedback mode 2-1. In the feedback mode 2-1 as described above, wCQI, second PMI, and L indicating the sub-band position preferred by the UE are transmitted together.

At RI=1, the sum of 4 bits for wCQI, 4 bits for PMI, and 2 bits for L is less than 11 bits at RI=1 and thus there is no problem in feedback transmission but, at RI>1, 3 extra bits of the spatial differential CQI are added to the 4 bits of CQI and thus the total number of bits to be transmitted becomes 13 bits. Since the total number of bits to be transmitted is greater than the 11 bits of the information amount allocated for CQI and PMI transmission on PUCCH, in order to solve this problem there is a need of performing codebook subsampling for the second PMI to allocate 2 bits.

At rank 2, the codebook subsampling is performed in such a way of generating precoders all available in the double codebook and searching for the precoding matrix combination without recurring precoder among them. For example, the codebook subsampling method considered with the double codebook $W=W_1 \cdot W_2$ generated using equation (5) includes 4 subsampling schemes (No. 1, 2, 3, and 4) that can be performed only with column selection without phase shift of antenna polarization and 9 subsampling schemes (No. 5, 6, 7, 8, 9, 10, 11, 12, and 13) that can be considered in consideration of the phase shift of the antenna polarization and column selection in $W_2(m)$.

(No. 0, 1, 2, 3). In order to facilitate implementation, the codebook subsampling may be performed with the scheme of equation (14) (No. 2) which is similar to the conventional technology.

$$W_2(m) = \frac{1}{2}\begin{bmatrix} Y_1 & Y_2 \\ Y_1 & -Y_2 \end{bmatrix} \tag{15}$$

and $(Y_1, Y_2) \in \{(e_1, e_1), (e_2, e_3), (e_1, e_4), (e_2, e_4)\}$

Although equation (5) is used as $W_2$ in the above embodiment, it is also possible to perform the codebook subsampling in the same way using equation (6) with the application of another type of distance other than Chordal distance and Fubini-Study distance.

Since the codebook of $W_2(m)$ is indicated with 2-b information amount in PUCCH mode 2-1, the index m of subsampled $W_2(m)$ has a distance from 0 to 3. The precoding matrix of $W_2(m)$ generated as the value of in changes is expressed as equation (16).

TABLE 6

| No. | Column Selection vector | Phase shift | Minimum Chordal distance | Minimum Fubini-Study distance |
|---|---|---|---|---|
| 1 | $(Y_1, Y_2) \in \{(e_1, e_1), (e_1, e_2), (e_1, e_4), (e_2, e_4)\}$ | $W_2 = \frac{1}{2}\begin{bmatrix} Y_1 & Y_2 \\ Y_1 & -Y_2 \end{bmatrix}$ | 0.707 | 0.785 |
| 2 | $(Y_1, Y_2) \in \{(e_1, e_1), (e_1, e_2), (e_1, e_4), (e_2, e_4)\}$ | $W_2 = \frac{1}{2}\begin{bmatrix} Y_1 & Y_2 \\ jY_1 & -jY_2 \end{bmatrix}$ | 0.707 | 0.785 |
| 3 | $(Y_1, Y_2) \in \{(e_1, e_1), (e_2, e_3), (e_1, e_4), (e_2, e_4)\}$ | $W_2 = \frac{1}{2}\begin{bmatrix} Y_1 & Y_2 \\ Y_1 & -Y_2 \end{bmatrix}$ | 0.707 | 0.785 |
| 4 | $(Y_1, Y_2) \in \{(e_1, e_1), (e_2, e_3), (e_1, e_4), (e_2, e_4)\}$ | $W_2 = \frac{1}{2}\begin{bmatrix} Y_1 & Y_2 \\ jY_1 & -jY_2 \end{bmatrix}$ | 0.707 | 0.785 |
| 5 | $(Y_1, Y_2) \in \{(e_1, e_1), (e_1, e_2)\}$ | $W_2 \in \left\{\frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix}\right\}$ | 0.000 | 0.000 |
| 6 | $(Y_1, Y_2) \in \{(e_1, e_1), (e_2, e_3)\}$ | | 0.000 | 0.000 |
| 7 | $(Y_1, Y_2) \in \{(e_1, e_1), (e_1, e_4)\}$ | | 0.000 | 0.000 |
| 8 | $(Y_1, Y_2) \in \{(e_1, e_1), (e_2, e_4)\}$ | | 0.000 | 0.000 |
| 9 | $(Y_1, Y_2) \in \{(e_1, e_2), (e_1, e_4)\}$ | | 0.707 | 0.723 |
| 10 | $(Y_1, Y_2) \in \{(e_1, e_2), (e_2, e_4)\}$ | | 0.707 | 0.723 |
| 11 | $(Y_1, Y_2) \in \{(e_2, e_3), (e_1, e_4)\}$ | | 0.707 | 0.723 |
| 12 | $(Y_1, Y_2) \in \{(e_2, e_3), (e_2, e_4)\}$ | | 0.707 | 0.723 |
| 13 | $(Y_1, Y_2) \in \{(e_1, e_4), (e_2, e_4)\}$ | | 0.707 | 0.723 |

In order to search for the best subsampling codebook among the 13 cases, the present embodiment selects the subsampling scheme securing the largest minimum distance using the Chordal distance and Fubini-Study distance as shown in equations (13) and (14).

$$d_{chordal}(A, B) = \frac{1}{\sqrt{2}}\|A \cdot A^H - B \cdot B^H\|_F \tag{13}$$

$$d_{FS}(A, B) = \arccos|\det(A^H \cdot B)| \tag{14}$$

On the basis of the above description, it is possible to perform the codebook subsampling with the four schemes $$W_2(0) = \frac{1}{2}\begin{bmatrix} Y_1 & Y_2 \\ Y_1 & -Y_2 \end{bmatrix} \text{ where } (Y_1, Y_2) = (e_1, e_1) \tag{16}$$

$$W_2(1) = \frac{1}{2}\begin{bmatrix} Y_1 & Y_2 \\ Y_1 & -Y_2 \end{bmatrix} \text{ where } (Y_1, Y_2) = (e_2, e_3)$$

$$W_2(2) = \frac{1}{2}\begin{bmatrix} Y_1 & Y_2 \\ Y_1 & -Y_2 \end{bmatrix} \text{ where } (Y_1, Y_2) = (e_1, e_4)$$

$$W_2(3) = \frac{1}{2}\begin{bmatrix} Y_1 & Y_2 \\ Y_1 & -Y_2 \end{bmatrix} \text{ where } (Y_1, Y_2) = (e_2, e_4)$$

The fourth embodiment of the present disclosure is directed to the feedback mode 2-1, too.

In the feedback mode 2-1 as described above, wCQI, second PMI, and L indicating the sub-band position preferred by the UE are transmitted together.

At RI=1, the sum of 4 bits for wCQI, 4 bits for PMI, and 2 bits for L is less than 11 bits at RI=1 and thus there is no problem in feedback transmission, but at RI>1, 3 extra bits of the spatial differential CQI are added to the 4 bits of CQI and thus the total number of bits to be transmitted becomes 13 bits. Since the total number of bits to be transmitted is greater than the 11 bits of the information amount allocated for CQI and PMI transmission on PUCCH, in order to solve this problem, there is a need of performing codebook subsampling for the second PMI to allocate 2 bits.

The present embodiment proposes a method of selecting the second PMI such that the precoder generated at rank 2 does not appear repeatedly. Table 6 arranges the values of n, (n+8), (n+16), and (n+24) included in the multiplier of natural logarithm e at each column of $X_n$ of equation (1) in association with the index n of $W_1(n)$.

TABLE 7

| n | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| n (first column) | 0 | 1 | 2 | 3 | 4 | 5 | 6 | 7 | 8 | 9 | 10 | 11 | 12 | 13 | 14 | 15 |
| n + 8 (second column) | 8 | 9 | 10 | 11 | 12 | 13 | 14 | 15 | 16 | 17 | 18 | 19 | 20 | 21 | 22 | 23 |
| n + 16 (third column) | 16 | 17 | 18 | 19 | 20 | 21 | 22 | 23 | 24 | 25 | 26 | 27 | 28 | 29 | 30 | 31 |
| n + 24 (fourth column) | 24 | 25 | 26 | 27 | 28 | 29 | 30 | 31 | 0 | 1 | 2 | 3 | 4 | 5 | 6 | 7 |

Comparing the elements of the columns indicated by index n and the elements of the columns indicated by index n+8 of $W_1(n)$ in table 7, the elements change positions while maintaining their values. For example, the elements of the column for n=0 are enumerated in the order of 0, 8, 16, and 24 while the elements of the column for n=8 are enumerated in the order of 8, 16, 24, and 0. That is, the recursive precoding matrices are generated. In order to prevent recursive precoding matrices from appearing in Table 7, it can be considered for the subsampled $W_2(m)$ to select the first or third column or to select the second or fourth column. In the case of performing the codebook subsampling of $W_2(m)$ of 2 bits, the first method assigns one bit to indicate the phase shift and the other bit to indicate selection of the first or third column of $W_1(n)$ as equation (17).

$$W_2 \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\} \text{ and } \quad (17)$$

$(Y_1, Y_2) \in \{(e_1, e_1), (e_3, e_3)\}$

The second method assigns one bit to indicate the phase shift and the other bit to indicate selection of the second or fourth column of $W_1(n)$.

$$W_2 \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\} \text{ and } \quad (18)$$

$(Y_1, Y_2) \in \{(e_2, e_2), (e_4, e_4)\}$

In the case of performing the subsampling as above, it is possible to generate the precoding matrices corresponding to all the cases of 0 to 31 in Table 6 without duplication and in consideration of the phase shift of the antenna polarization by combining $W_1(n)$ and $W_2(m)$.

The $W_2(m)$ subsampling in PUCCH mode 2-1 according to the fourth embodiment can be arranged as shown in table 7. At rank 1, since the sum of 4 bits for sCQI, 4 bits for PMI, and 2 bits for L is not greater than 11 bits, the indices of the case without application of codebook subsampling are arranged. In the case of RI>1, the codebook sampling is applied such that the indices for equations (16) and (17) are arranged for the respective cases where $W_2(m)$ have the forms of equations (5) or (6). At ranks 3 and 4, the last four indices of the legacy codebook (table 1) which have been designed so as to be advantageous for the cross polarization linear antenna array are arranged. Table 8 shows the subsampling ($W_2$: 2 bits) in PUCCH mode 2-1 according to the fourth embodiment.

TABLE 8

| Rank | index m for $W_2$ |
|---|---|
| 1 | 0-15 |
| 2 | Appling equation (5): $\{0, 1, 4, 5\}$ or $\{2, 3, 6, 7\}$ |

TABLE 8-continued

| Rank | index m for $W_2$ |
|---|---|
|  | Applying equation (6): $\{4, 5, 8, 9\}$ or $\{6, 7, 10, 11\}$ |
| 3 | Legacy codebook 12, 13, 14, 15 |
| 4 | Legacy codebook 12, 13, 14, 15 |

Figure 7:
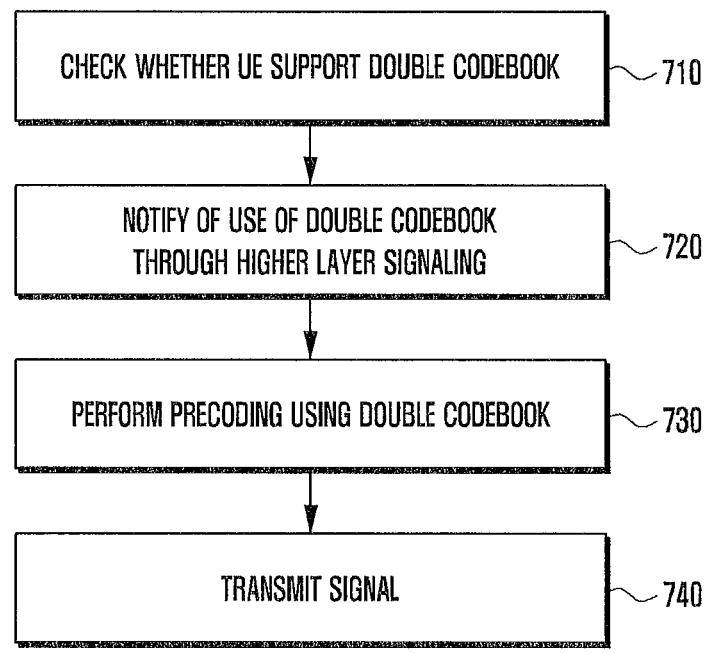
FIG. 7 is a flowchart illustrating the operation procedure of the eNB in the channel state information feedback method according to an embodiment of the present disclosure.

FIG. 7 is a flowchart illustrating the operation procedure of the eNB in the channel state information feedback method according to an embodiment of the present disclosure. The eNB checks whether the UE supports the double codebook for 4 Tx MIMO transmission at operation 710. If there is no response or if the UE does not support the double codebook, the eNB uses the legacy codebook. If the UE supports the double codebook, the eNB notifies the UE of the use of the double codebook and the PUCCH feedback type for periodic channel state information report through higher layer signaling at operation 720. For this purpose, a double book use indicator and a feedback type indicator may be used. Afterward, the eNB may receive periodic CSI report generated according to the configuration transmitted to the UE. The eNE performs precoding based on the double codebook and the received CSI report at operation 730 and transmits the precoded signal to the UE at operation 740.

Figure 8:
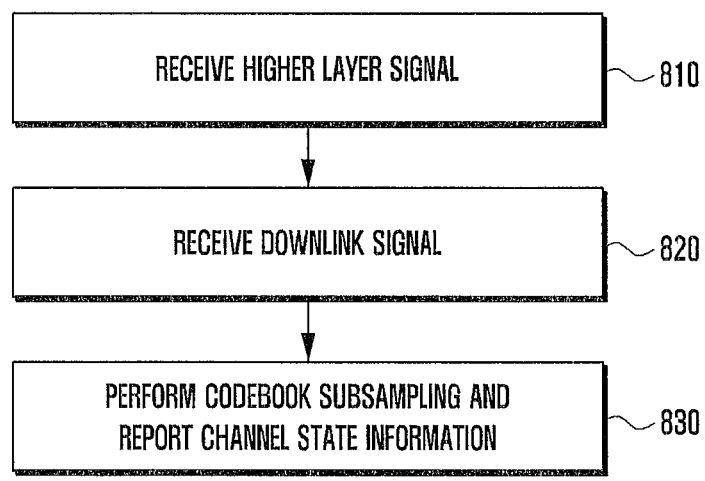
FIG. 8 is a flowchart illustrating the operation procedure of the UE in the channel state information feedback method according to an embodiment of the present disclosure.

FIG. 8 is a flowchart illustrating the operation procedure of the UE in the channel state information feedback method according to an embodiment of the present disclosure. The UE receives a higher layer signal transmitted by the eNB at operation 810 so as to check the double codebook for use in 4 Tx MIMO transmission of the eNB and PUCCH feedback. If no higher layer signal is received or if it is notified from the eNB that the legacy codebook is to be used, the UE uses the legacy 4 Tx MIMO codebook. If it is notified from the eNB that the dual codebook (double codebook) for 4 Tx MIMO transmission, the terminal performs PDSCH decoding using the double codebook at operation 820. The UE generates channel state information fit for the PUCCH feedback type indicated by the received configuration and performs codebook subsampling to report channel state periodically at operation 830.

Figure 9:
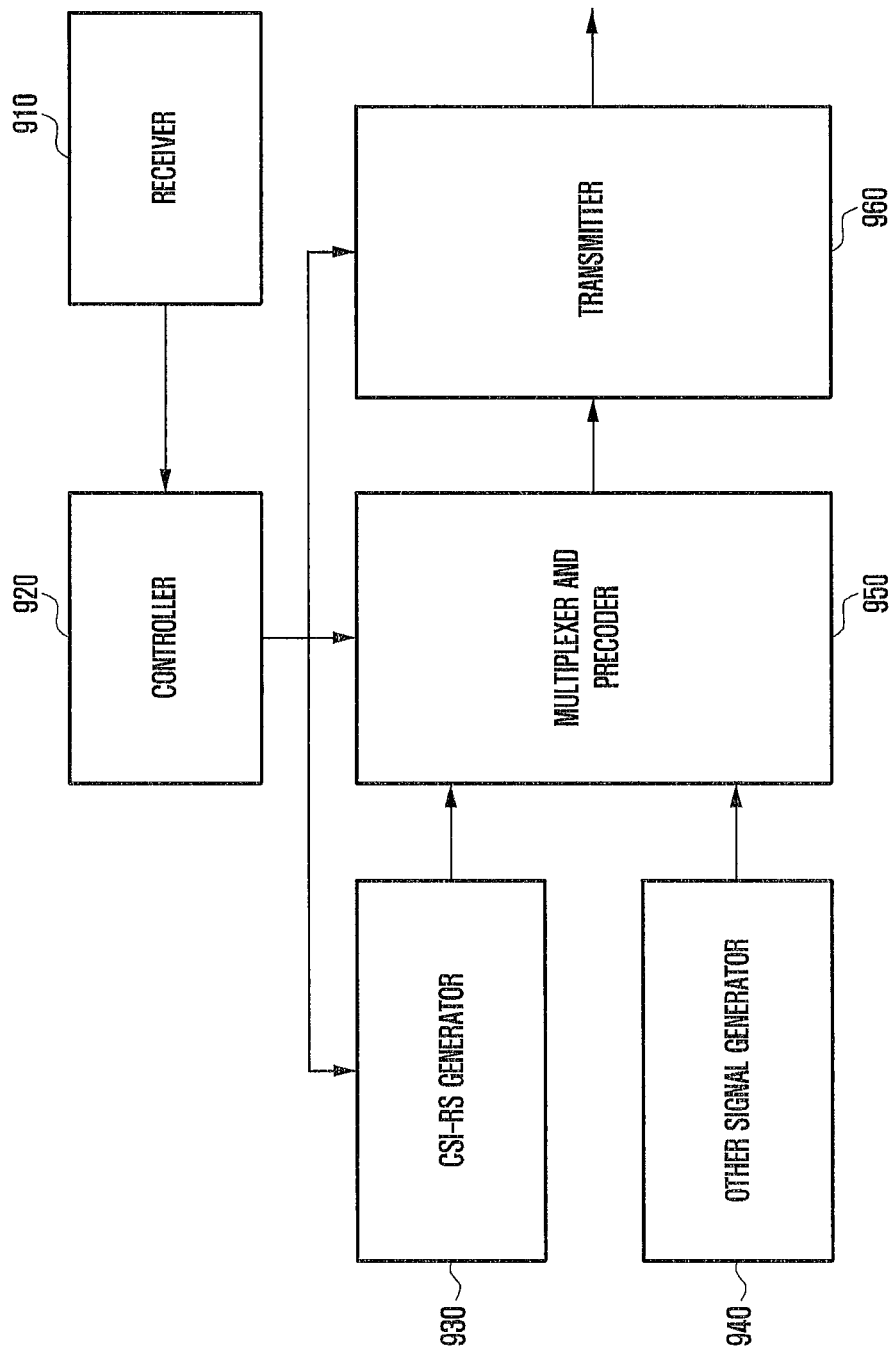
FIG. 9 is a block diagram illustrating a configuration of the eNB for 4 Tx MIMO transmission according to an embodiment of the present disclosure.

FIG. 9 is a block diagram illustrating a configuration of the eNB for 4 Tx MIMO transmission according to an embodiment of the present disclosure. In FIG. 9, the eNB receives periodic and/or aperiodic channel state information, PUSCH, and information it has requested from the UE by means of the receiver 910. The controller 920 determines PUCCH feedback type and whether to perform double codebook-based precoding based on the information received by the receiver 910. The CSI-RS signal generator 930 generates CSI-RS for the UE to measure the channel state. The multiplexer/precoder 950 performs precoding on PDSCH among the signals input by other signal generator 940 using the double codebook, multiplexes the PDSCH and reference signal input by the CSI-RS signal generator, and sends the multiplexed signal to the transmitter 960.

The individual components of the eNB may perform the operation necessary for at least one of the embodiments described above. Particularly, the controller 920 controls the respective components to perform the operations necessary for at least one of the embodiments described above. The transmitter 960 and the receiver 910 may be referred to as a communication unit integrally. The communication unit may transmit/receive signals necessary for at least one of the embodiments described above.

Figure 10:
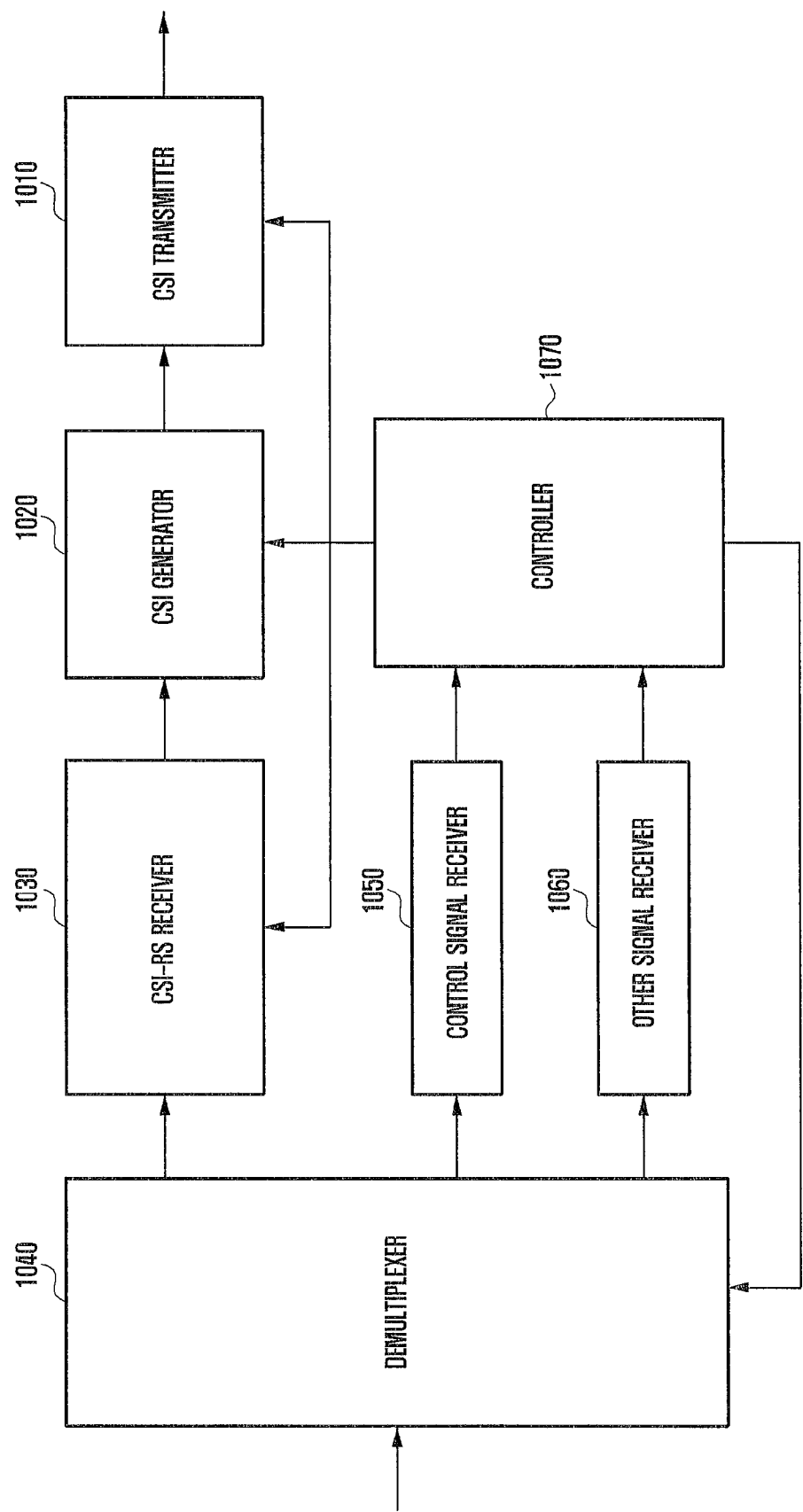
FIG. 10 is a block diagram illustrating a configuration of the UE supporting double codebook-based feedback for 4 Tx MIMO downlink transmission according to an embodiment of the present disclosure.

FIG. 10 is a block diagram illustrating a configuration of the UE supporting double codebook-based feedback for 4 Tx MIMO downlink transmission according to an embodiment of the present disclosure. The controller 1070 controls such that the radio signal received from the eNB is input to the demultiplexer 1040. The demultiplexer 1040 demultiplexes the received signal into CSI-RS, control signal, and other signals. The CSI-RS is input to the CSI-RS receiver 1030, the channel state information generator 1020 generates channel state information to be transmitted to the eNB based on the CSI-RS, and the channel state information transmitter transmits the channel state information to the eNB. The control signal receiver 1050 checks the information on whether the double codebook is used and PUCCH feedback type and transfers this information to the controller 1070. The controller 1070 retrieves the $W_1$ and $W_2$ codebook indices based on the information received from the control signal receiver 1050 to perform decoding and provides the channel state information generator 1020 with the information related to the channel state feedback to perform codebook subsampling suitable for the feedback mode.

The individual components of the UE may perform the operations necessary for at least one of the embodiments described above. Particularly, the controller 1070 may control the respective components to perform the operations necessary for at least one of the embodiments described above. The components of transmitting and receiving signals to and from the UE may be referred to as a communication unit integrally. The communication unit may transmit/receive signals necessary for at least one of the embodiments described above.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "module" according to the embodiments of the disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

As described above, the CSI transmission/reception method of the present disclosure is advantageous in transmitting CSI report efficiently.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method of a terminal in a mobile communication system, comprising:
  receiving a control signal from a base station, the control signal including a first information element indicating whether at least one predetermined codebook is being used for deriving channel state information (CSI) feedback and a second information element;

determining, if a field of the first information element is set to a predetermined value and a CSI reporting mode identified based on the second information element is a predetermined mode, a codebook corresponding to the CSI reporting mode among the at least one predetermined codebook;

generating a CSI based on the identified codebook, the CSI including at least one of information related to a rank indicator (RI), information related to a first precoding matrix indicator (PMI), and information related to a second PMI; and transmitting the generated CSI to the base station.

2. The method of claim 1, wherein the predetermined mode is mode 1-1 submode 2, and wherein generating a CSI comprises generating the information related to the first PMI based on a first codebook index and the information related to the second PMI based on a second codebook index.

3. The method of claim 2, wherein the information related to the first PMI and the information related to the second PMI are identified based on values shown in the following table:

| | Relationship between the first PMI value and codebook index $i_1$ | | Relationship between the second PMI value and codebook index $i_2$ | |
|---|---|---|---|---|
| RI | Value of the first PMI $I_{PMI1}$ | Codebook index $i_1$ | Value of the second PMI $I_{PMI2}$ | Codebook index $i_2$ |
| 1 | 0-3 | $4I_{PMI1}$ | 0-3 | $2I_{PMI2} + 4 \cdot \lfloor I_{PMI2}/2 \rfloor$ |
| 2 | 0-3 | $4I_{PMI1}$ | 0-3 | $I_{PMI2} + 2 \cdot \lfloor I_{PMI2}/2 \rfloor$ |
| 3 | 0 | 0 | 0-15 | $I_{PMI2}$ |
| 4 | 0 | 0 | 0-15 | $I_{PMI2}$ | where $I_{PMI1}$ represents a value of the first PMI, $I_{PMI2}$ represents a value of the second PMI, $i_1$ represents a value of the first codebook index, and $i_2$ represents a value of the second codebook index.

4. The method of claim 1, wherein the predetermined mode is mode 1-1 submode 1, and wherein generating a CSI comprises generating information related to a joint encoding of the RI and the first PMI based on the identified codebook.

5. The method of claim 4, wherein if the RI is 1 or 2, a codebook index of the joint encoding of the RI and the first PMI is one of a predetermined index set, the predetermined index set is {0,1,2,3,4,5,6,7}.

6. A communication method of a base station in a mobile communication system, comprising:

transmitting a control signal to a terminal, the control signal including a first information element indicating whether at least one predetermined codebook is being used for deriving channel state information (CSI) feedback and a second information element; and receiving a report for channel state information (CSI) from the terminal, wherein if a field of the first information element is set to a predetermined value and a CSI reporting mode identified based on the second information element is a predetermined mode, a codebook corresponding to the CSI reporting mode is identified among the at least one predetermined codebook, wherein the report for CSI is generated based on the identified codebook, the CSI including at least one of information related to a rank indicator (RI), information related to a first precoding matrix indicator (PMI), and information related to a second PMI.

7. The method of claim 6, wherein the predetermined mode is mode 1-1 submode 2, and wherein the information related to the first PMI is generated based on a first codebook index and the information related to the second PMI is generated based on a second codebook index.

8. The method of claim 7, wherein the information related to the first PMI and the information related to the second PMI are determined based on values shown in the following table:

| | Relationship between the first PMI value and codebook index $i_1$ | | Relationship between the second PMI value and codebook index $i_2$ | |
|---|---|---|---|---|
| RI | Value of the first PMI $I_{PMI1}$ | Codebook index $i_1$ | Value of the second PMI $I_{PMI2}$ | Codebook index $i_2$ |
| 1 | 0-3 | $4I_{PMI1}$ | 0-3 | $2I_{PMI2} + 4 \cdot \lfloor I_{PMI2}/2 \rfloor$ |
| 2 | 0-3 | $4I_{PMI1}$ | 0-3 | $I_{PMI2} + 2 \cdot \lfloor I_{PMI2}/2 \rfloor$ |
| 3 | 0 | 0 | 0-15 | $I_{PMI2}$ |
| 4 | 0 | 0 | 0-15 | $I_{PMI2}$ | where $I_{PMI1}$ represents a value of the first PMI, $I_{PMI2}$ represents a value of the second PMI, $i_1$ represents a value of the first codebook index, and $i_2$ represents a value of the second codebook index.

9. The method of claim 6, wherein the predetermined mode is mode 1-1 submode 1, and wherein receiving a report for CSI comprises receiving information related to a joint encoding of the RI and the first PMI.

10. The method of claim 9, wherein if the RI is 1 or 2, a codebook index of the joint encoding of the RI and the first PMI is one of a predetermined index set, the predetermined index set is {0,1,2,3,4,5,6,7}.

11. A communication apparatus of a terminal, the apparatus comprising:

a transceiver for transmitting and receiving a signal; and a controller to control:

receiving a control signal from a base station, the control signal including a first information element indicating whether at least one predetermined codebook is being used for deriving channel state information (CSI) feedback and a second information element;

identifying, if a field of the first information element is set to a predetermined value and a CSI reporting mode identified based on the second information element is a predetermined mode, a codebook corresponding to the CSI reporting mode among the at least one predetermined codebook;

generating a CSI based on the identified codebook, the CSI including at least one of information related to a rank indicator (RI), information related to a first precoding matrix indicator (PMI), and information related to a second PMI; and transmitting the generated CSI to the base station.

12. The apparatus of claim 11, wherein the predetermined mode is mode 1-1 submode 2, and wherein generating a CSI comprises generating the first PMI based on the information related to a first codebook index and the information related to the second PMI based on a second codebook index.

13. The apparatus of claim 12, wherein the information related to the first PMI and the information related to the second PMI are identified based on values shown in the following table:

| | Relationship between the first PMI value and codebook index $i_1$ | | Relationship between the second PMI value and codebook index $i_2$ | |
|---|---|---|---|---|
| RI | Value of the first PMI $I_{PMI1}$ | Codebook index $i_1$ | Value of the second PMI $I_{PMI2}$ | Codebook index $i_2$ |
| 1 | 0-3 | $4I_{PMI1}$ | 0-3 | $2I_{PMI2} + 4 \cdot \lfloor I_{PMI2}/2 \rfloor$ |
| 2 | 0-3 | $4I_{PMI1}$ | 0-3 | $I_{PMI2} + 2 \cdot \lfloor I_{PMI2}/2 \rfloor$ |
| 3 | 0 | 0 | 0-15 | $I_{PMI2}$ |
| 4 | 0 | 0 | 0-15 | $I_{PMI2}$ | where IPMI1 represents a value of the first PMI, IPMI2 represents a value of the second PMI, i1 represents a value of the first codebook index, and i2 represents a value of the second codebook index.

14. The apparatus of claim 11, wherein the predetermined mode is mode 1-1 submode 1, and
wherein generating a CSI comprises generating information related to a joint encoding of the RI and the first PMI based on the identified codebook.

15. The apparatus of claim 14, wherein if the RI is 1 or 2, a codebook index of the joint encoding of the RI and the first PMI is one of a predetermined index set, the predetermined index set is {0,1,2,3,4,5,6,7}.

16. A communication apparatus of a base station, the apparatus comprising:
a transceiver for transmitting and receiving a signal; and
a controller to control:
transmitting a control signal to a terminal, the control signal including a first information element indicating whether at least one predetermined codebook is being used for deriving channel state information (CSI) feedback and a second information element; and
receiving a report for channel state information (CSI) from the terminal,
wherein if a field of the first information element is set to a predetermined value and a CSI reporting mode identified based on the second information element is a predetermined mode, a codebook corresponding to the CSI reporting mode is identified among the at least one predetermined codebook,
wherein the report for CSI is generated based on the identified codebook, the CSI including at least one of information related to a rank indicator (RI), information related to a first precoding matrix indicator (PMI) and information related to a second PMI.

17. The apparatus of claim 16, wherein the predetermined mode is mode 1-1 submode 2, and
wherein the information related to the first PMI is generated based on a first codebook index and the information related to the second PMI is generated based on a second codebook index.

18. The apparatus of claim 17, wherein the information related to the first PMI and the information related to the second PMI are identified based on values shown in the following table:

| | Relationship between the first PMI value and codebook index $i_1$ | | Relationship between the second PMI value and codebook index $i_2$ | |
|---|---|---|---|---|
| RI | Value of the first PMI $I_{PMI1}$ | Codebook index $i_1$ | Value of the second PMI $I_{PMI2}$ | Codebook index $i_2$ |
| 1 | 0-3 | $4I_{PMI1}$ | 0-3 | $2I_{PMI2} + 4 \cdot \lfloor I_{PMI2}/2 \rfloor$ |
| 2 | 0-3 | $4I_{PMI1}$ | 0-3 | $I_{PMI2} + 2 \cdot \lfloor I_{PMI2}/2 \rfloor$ |
| 3 | 0 | 0 | 0-15 | $I_{PMI2}$ |
| 4 | 0 | 0 | 0-15 | $I_{PMI2}$ | where $I_{PMI1}$ represents a value of the first PMI, $I_{PMI2}$ represents a value of the second PMI, $i_1$ represents a value of the first codebook index, and $i_2$ represents a value of the second codebook index.

19. The apparatus of claim 16, wherein the predetermined mode is mode 1-1 submode 1, and
wherein receiving a report for CSI comprises receiving information related to a joint encoding of the RI and the first PMI.

20. The apparatus of claim 19, wherein if the RI is 1 or 2, a codebook index of the joint encoding of the RI and the first PMI is one of a predetermined index set, the predetermined index set is {0,1,2,3,4,5,6,7}.

* * * * *